US008600765B2

(12) United States Patent
Liu et al.

(10) Patent No.: US 8,600,765 B2
(45) Date of Patent: Dec. 3, 2013

(54) SIGNAL CLASSIFICATION METHOD AND DEVICE, AND ENCODING AND DECODING METHODS AND DEVICES

(71) Applicant: Huawei Technologies Co., Ltd., Guangdong (CN)

(72) Inventors: Zexin Liu, Beijing (CN); Lei Miao, Beijing, CA (US); Anisse Taleb, Kista (SE)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/728,201

(22) Filed: Dec. 27, 2012

(65) Prior Publication Data

US 2013/0117029 A1 May 9, 2013

Related U.S. Application Data

(63) Continuation of application No. PCT/CN2011/081114, filed on Oct. 21, 2011.

(30) Foreign Application Priority Data

May 25, 2011 (CN) .......................... 2011 1 0138461

(51) Int. Cl.
*G10L 19/00* (2013.01)
*G10L 19/02* (2013.01)
*G10L 15/00* (2013.01)
*G10L 19/14* (2006.01)
*G10L 11/04* (2006.01)

(52) U.S. Cl.
USPC ........... 704/500; 704/203; 704/236; 704/501; 704/503; 704/229; 704/205; 704/206

(58) Field of Classification Search
USPC ......... 704/203, 236, 500, 501, 503, 229, 205, 704/206
See application file for complete search history.

(56) References Cited

U.S. PATENT DOCUMENTS 5,018,200 A * 5/1991 Ozawa .......................... 704/222
5,937,377 A * 8/1999 Hardiman et al. ............ 704/225

(Continued)

FOREIGN PATENT DOCUMENTS

CN 101630509 A 1/2010
CN 101751925 A 6/2010

(Continued)

OTHER PUBLICATIONS

"ITU-T Recommendation G.711.1 Amendment 4 (ex G.711.1-SWB)—Wideband Embedded Extension for G.711 PCM: New Annex D with Superwideband Extension," Attachment 1 to TD 270/PLEN (Jul. 2010) + Editorial cleanup, Jul. 2010, ITU-T, Geneva, Switzerland.

(Continued)

*Primary Examiner* — Edgar Guerra-Erazo
(74) *Attorney, Agent, or Firm* — Huawei Technologies, Co. Ltd.

(57) ABSTRACT

Embodiments of the present invention provide a signal classification method and device, and encoding and decoding methods and devices. The encoding method includes: dividing a current frame into a low-frequency band signal and a high-frequency band signal; attenuating the high-frequency band signal or a to-be-encoded characteristic parameter of the high-frequency band signal according to an energy attenuation value of the low-frequency band signal, where the energy attenuation value indicates energy attenuation of the low-frequency band signal caused by encoding of the low-frequency band signal; and encoding the attenuated high-frequency band signal or the attenuated to-be-encoded characteristic parameter of the high-frequency band signal. The technical solutions according to the embodiments of the present invention can improve the effect of combining the low-frequency band signal and the high-frequency band signal at the decoder.

36 Claims, 7 Drawing Sheets

(56) References Cited

U.S. PATENT DOCUMENTS

| | | | | |
|---|---|---|---|---|
| 5,953,696 | A * | 9/1999 | Nishiguchi et al. | 704/209 |
| 6,453,285 | B1 * | 9/2002 | Anderson et al. | 704/210 |
| 6,615,169 | B1 * | 9/2003 | Ojala et al. | 704/205 |
| 6,959,274 | B1 * | 10/2005 | Gao et al. | 704/219 |
| 6,978,236 | B1 * | 12/2005 | Liljeryd et al. | 704/219 |
| 7,676,043 | B1 | 3/2010 | Tsutsui et al. | |
| 8,000,976 | B2 * | 8/2011 | Tashiro et al. | 704/503 |
| 8,069,038 | B2 * | 11/2011 | Malah et al. | 704/205 |
| 8,078,459 | B2 * | 12/2011 | Dai | 704/223 |
| 8,103,515 | B2 * | 1/2012 | Chen et al. | 704/500 |
| 2003/0093278 | A1 * | 5/2003 | Malah | 704/265 |
| 2003/0093279 | A1 * | 5/2003 | Malah et al. | 704/265 |
| 2004/0181403 | A1 * | 9/2004 | Hsu | 704/230 |
| 2005/0004793 | A1 | 1/2005 | Ojala et al. | |
| 2006/0282262 | A1 | 12/2006 | Vos et al. | |
| 2007/0038439 | A1 * | 2/2007 | Schuijers et al. | 704/212 |
| 2008/0027715 | A1 * | 1/2008 | Rajendran et al. | 704/205 |
| 2008/0027717 | A1 * | 1/2008 | Rajendran et al. | 704/210 |
| 2008/0069364 | A1 * | 3/2008 | Itou et al. | 381/17 |
| 2008/0086302 | A1 * | 4/2008 | Krishnan et al. | 704/225 |
| 2008/0221905 | A1 * | 9/2008 | Schnell et al. | 704/500 |
| 2008/0312914 | A1 * | 12/2008 | Rajendran et al. | 704/207 |
| 2009/0226010 | A1 * | 9/2009 | Schnell et al. | 381/119 |
| 2009/0313009 | A1 * | 12/2009 | Kovesi et al. | 704/203 |
| 2010/0228557 | A1 * | 9/2010 | Chen et al. | 704/500 |
| 2011/0035212 | A1 * | 2/2011 | Briand et al. | 704/203 |
| 2011/0173004 | A1 * | 7/2011 | Bessette et al. | 704/500 |
| 2011/0194598 | A1 * | 8/2011 | Miao et al. | 375/240 |
| 2011/0264454 | A1 * | 10/2011 | Ullberg et al. | 704/500 |
| 2011/0295598 | A1 * | 12/2011 | Yang et al. | 704/205 |
| 2011/0320211 | A1 | 12/2011 | Liu et al. | |
| 2012/0146831 | A1 * | 6/2012 | Eksler | 341/200 |
| 2012/0275607 | A1 * | 11/2012 | Kjoerling et al. | 381/22 |
| 2012/0296641 | A1 * | 11/2012 | Rajendran et al. | 704/206 |

FOREIGN PATENT DOCUMENTS

| | | | |
|---|---|---|---|
| CN | 101751926 | A | 6/2010 |
| CN | 101770775 | A | 7/2010 |

OTHER PUBLICATIONS

"ITU-T Recommendation G.722 Amendment 1 (ex G.722-SWB)—7 kHz Audio-Coding within 64 kbit/s: New Annex B with Superwideband Embedded Extension," Attachment 1 to TD 271/PLEN (Jul. 2010) + Editorial cleanup, Jul. 2010, ITU-T, Geneva, Switzerland.

International Search Report in corresponding International Patent Application No. PCT/CN2011/081114 (Feb. 16, 2012).

Search report issued in corresponding European patent application No. 11866414.3, dated Jul. 23, 2013, total 10 pages.

* cited by examiner

SIGNAL CLASSIFICATION METHOD AND DEVICE, AND ENCODING AND DECODING METHODS AND DEVICES

CROSS-REFERENCE TO RELATED APPLICATIONS

This application is a continuation of International Patent Application No. PCT/CN2011/081114, filed on Oct. 21, 2011, which claims priority to Chinese Patent Application No. 201110138461.1, filed on May 25, 2011, both of which are hereby incorporated by reference in their entireties.

FIELD OF THE INVENTION

The present invention relates to the field of voice and audio technologies, and in particular, to a signal classification method and device, and encoding and decoding methods and devices.

BACKGROUND OF THE INVENTION

In audio and voice processing technologies, a bandwidth expansion technology already emerges, that is, a high-frequency band signal is encoded using a small number of bits so as to expand a frequency band range of a voice/audio signal. The bandwidth expansion technology has developed fast in recent years and has been commercially applied in some encoders and decoders.

The bandwidth expansion technology adopted currently is basically a multi-mode bandwidth expansion technology, where according to signal characteristics of a high-frequency band signal in an input signal, a signal class of the high-frequency band signal is determined, and different encoding and decoding algorithms are adopted for different signal classes. According to signal characteristics of high-frequency band signals, the high-frequency band signals are classified into four classes: a transient (Transient) class, a harmonic class (Harmonic), a noise (Noise) class and a normal (Normal) class. A specific classification process includes: dividing a high-frequency band time-domain signal of a certain frame into several sub-frames, obtaining a time-domain envelope of each sub-frame, and when energy of a certain sub-frame is greater than a certain number of times of energy of a previous sub-frame and the energy of the sub-frame is greater than a certain number of times of average energy of all sub-frames in the whole frame, determining that the high-frequency band signal of the frame is of the transient class; if the frame is not of the transient class, dividing a high-frequency band frequency-domain signal of the frame into several sub-bands, obtaining a peak-to-average ratio of each sub-band, where the peak-to-average ratio is a ratio of peak energy or amplitude of the sub-band to average energy or amplitude of the sub-band, and when the number of sub-bands having a peak-to-average ratio greater than a threshold is greater than a certain number, determining that the high-frequency band signal of the frame is of the harmonic class; when the number of sub-bands having a peak-to-average ratio smaller than a threshold is greater than a certain number, determining that the high-frequency band signal of the frame is noise; otherwise, determining that the high-frequency band signal of the frame is of the normal class.

The prior art has the following disadvantages.

In the prior art, during signal classification for a high-frequency band signal of a certain frame, only characteristics of the high-frequency band signal of the frame are considered, which results in an inaccurate signal classification result for the high-frequency band signal of the frame.

SUMMARY OF THE INVENTION

Embodiments of the present invention provide a signal classification method and a signal classification device, which provide a more accurate signal classification result.

In view of this, the embodiments of the present invention provide the following:

A signal classification method includes:

dividing a current frame into a low-frequency band signal and a high-frequency band signal;

determining, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter; and determining a signal class of the high-frequency band signal of the current frame according to a determining result.

A signal classification device includes:

a division unit, configured to divide a current frame into a low-frequency band signal and a high-frequency band signal;

a judgment unit, configured to determine, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter; and a determination unit, configured to determine a signal class of the high-frequency band signal of the current frame according to a determining result.

An encoding method includes:

dividing a current frame into a low-frequency band signal and a high-frequency band signal;

attenuating the high-frequency band signal or a to-be-encoded characteristic parameter of the high-frequency band signal according to an energy attenuation value of the low-frequency band signal, where the energy attenuation value indicates energy attenuation of the low-frequency band signal caused by encoding of the low-frequency band signal; and encoding the attenuated high-frequency band signal or the attenuated to-be-encoded characteristic parameter of the high-frequency band signal.

A decoding method includes:

decoding a bit stream to obtain a high-frequency band signal of a current frame or a characteristic parameter of the high-frequency band signal of the current frame; and attenuating the high-frequency band signal or the characteristic parameter of the high-frequency band signal according to an energy attenuation value of a low-frequency band signal of the current frame, where the energy attenuation value indicates energy attenuation of the low-frequency band signal caused by encoding of the low-frequency band signal.

An encoding device includes:

a division unit, configured to divide a current frame into a low-frequency band signal and a high-frequency band signal;

a correction unit, configured to attenuate the high-frequency band signal or a to-be-encoded characteristic parameter of the high-frequency band signal according to an energy attenuation value of the low-frequency band signal, where the energy attenuation value indicates energy attenuation of the low-frequency band signal caused by encoding of the low-frequency band signal of the current frame; and an encoding unit, configured to encode the attenuated high-frequency band signal or the attenuated to-be-encoded characteristic parameter of the high-frequency band signal.

A decoding device includes:

a decoding unit, configured to decode a bit stream to obtain a high-frequency band signal of a current frame or a characteristic parameter of the high-frequency band signal of the current frame; and a correction unit, configured to attenuate the high-frequency band signal or the characteristic parameter of the high-frequency band signal according to an energy attenuation value of a low-frequency band signal of the current frame, where the energy attenuation value indicates energy attenuation of the low-frequency band signal caused by encoding of the low-frequency band signal of the current frame.

In an embodiment of the present invention, during signal classification, it is determined according to a value requirement of a preset encoding/decoding characteristic parameter corresponding to a signal class, whether an encoding/decoding characteristic parameter of a current frame meets the value requirement of the encoding/decoding characteristic parameter, so as to determine whether a signal class of a high-frequency band signal of the current frame is the signal class corresponding to the encoding/decoding characteristic parameter, and in this way, encoding/decoding characteristics of different signal classes are taken into consideration during signal classification, thereby making the signal classification for the high-frequency band signal of the current frame more accurate.

In another embodiment of the present invention, a high-frequency band signal or a to-be-encoded characteristic parameter of the high-frequency band signal is attenuated according to an energy attenuation value of a low-frequency band signal of a current frame, and an attenuation result is encoded and sent to a decoder, so that energy of the high-frequency band signal obtained by the decoder by decoding is attenuated accordingly, thereby achieving a better effect after the high-frequency band signal is combined with the low-frequency band signal.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
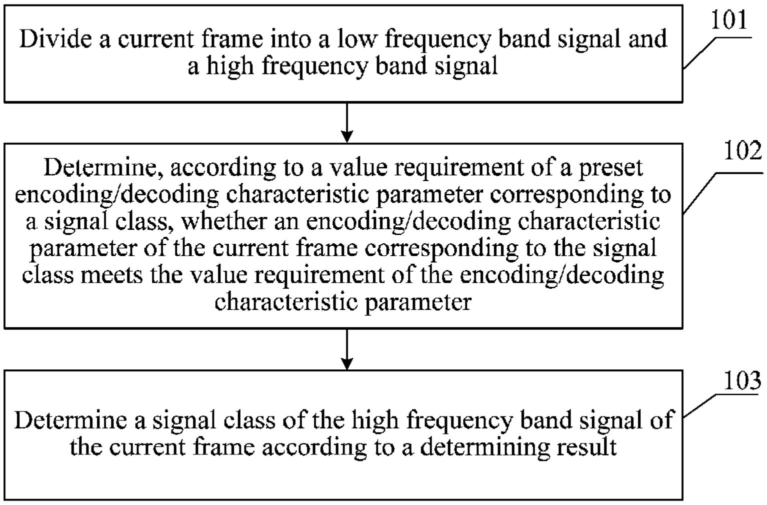
FIG. 1 is a flow chart of a signal classification method provided in an embodiment of the present invention.
Figure 2A:
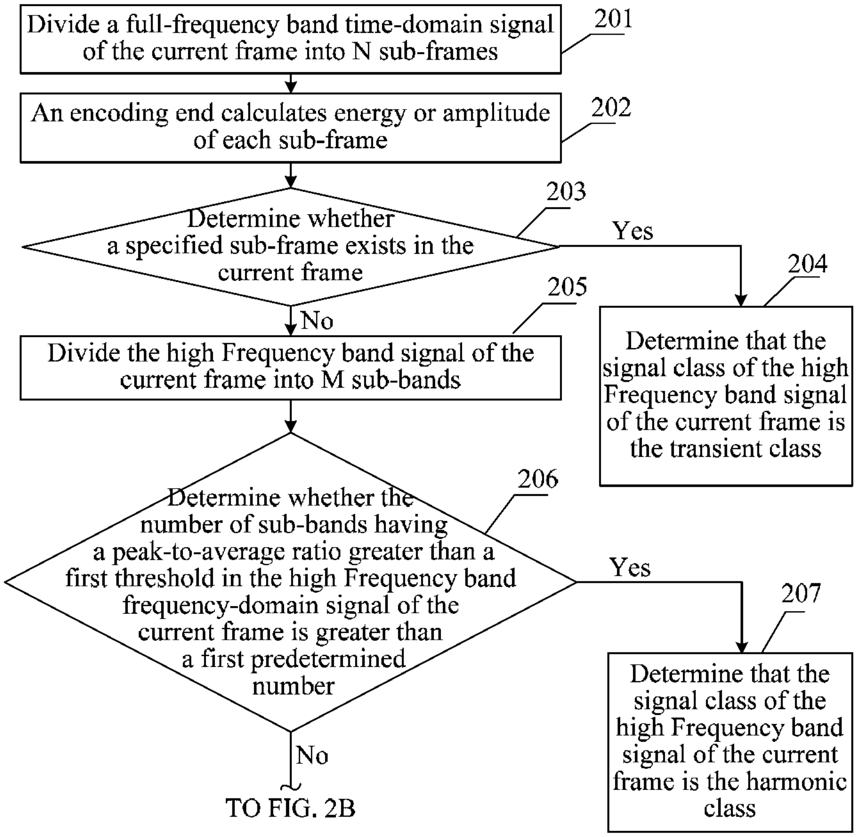
FIG. 2A and FIG. 2B is a flow chart of a signal classification method provided in another embodiment of the present invention.
Figure 2B:
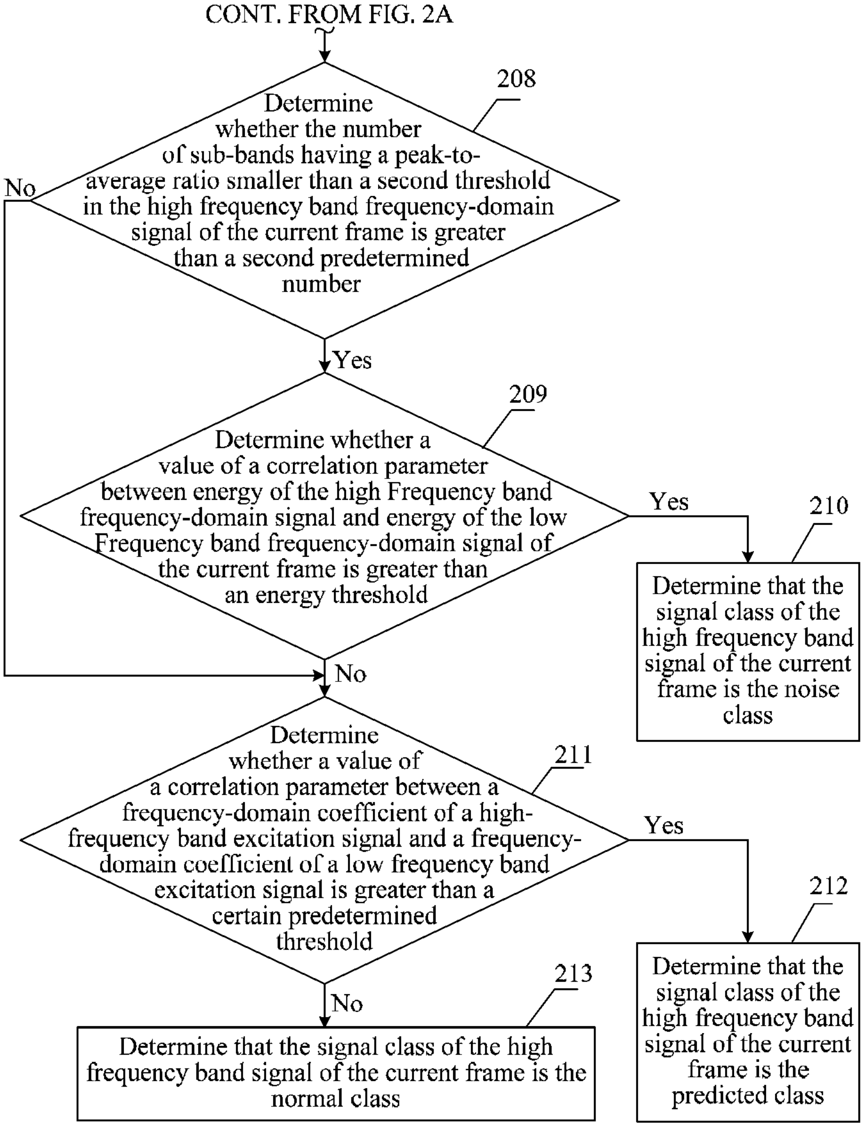

The following embodiments of the present invention take encoding/decoding characteristics of different signal classes into consideration during signal classification, and to make the technical solutions according to the embodiments of the present invention clearer, characteristics of encoding/decoding algorithms for different signal classes are described briefly in the following.

1. When the class of a high-frequency band signal of a current frame is a noise class, the encoding/decoding process of the high-frequency band signal of the current frame includes: during encoding, an encoder needs to obtain ratios of frequency-domain envelopes of sub-bands of the high-frequency band signal to frequency-domain envelopes of corresponding sub-bands of a low-frequency band signal, and send the ratios to a decoder. In this manner, the encoder and the decoder predetermine a mapping relationship between a certain sub-band of the high-frequency band signal and a certain sub-band of the low-frequency band signal. Alternatively, the encoder searches, according to the frequency-domain envelopes of the sub-bands of the low-frequency band signal, for a sub-band that is most correlated to a frequency-domain envelope of a sub-band of the high-frequency band signal, and then sends the decoder a sub-band number (that is, a serial number of the found sub-band of the low-frequency band signal), and a ratio of the frequency-domain envelope of the sub-band of the high-frequency band signal to the frequency-domain envelope of the found sub-band of the low-frequency band signal. During decoding, the decoder searches for a sub-band of the low-frequency band signal corresponding to the sub-band number, and determines a frequency-domain envelope of each sub-band of the high-frequency band signal according to the ratio sent by the encoder and the frequency-domain envelope of the sub-band of the low-frequency band signal determined according to the sub-band number. The decoder directly uses an excitation spectrum of a specified frequency range of the low frequency band as an excitation spectrum of the high frequency band, and in this way, a data frame of the noise class can be decoded successfully. It can be seen from the above analysis that, because the encoding/decoding algorithm utilizes the correlation between the frequency-domain envelopes of the sub-bands of the high-frequency band signal and the frequency-domain envelopes of the corresponding sub-bands of the low-frequency band signal when the class of the high-frequency band signal of the current frame is the noise class, it may be considered, during signal classification, that the class of the high-frequency band signal for which the frequency-domain envelope of the high-frequency band signal is strongly correlated to the frequency-domain envelope of the low-frequency band signal may be determined as the noise class on the premise that the number of sub-bands having a peak-to-average ratio smaller than a threshold is greater than a certain number.

2. When the class of the high-frequency band signal of the current frame is a predicted class, the encoding/decoding process of the high-frequency band signal of the data frame includes: during encoding, the encoder first selects, from excitation spectrums of sub-bands of the low-frequency band signal, a sub-band that is most correlated to excitation spectrums of sub-bands of the high-frequency band signal, sends a serial number of the selected sub-band to the decoder, and at the same time, sends frequency-domain envelopes of the sub-bands of the high-frequency band signal to the decoder. The decoder determines, according to the received frequency-domain envelopes of the sub-bands of the high-frequency band signal, a frequency-domain envelope of the whole high-frequency band signal; and predicts excitation spectrums of the sub-bands of the high-frequency band signal from the low-frequency band signal according to the received sub-band serial number, so as to determine an excitation spectrum of the whole high-frequency band signal. It can be seen from the above analysis that, because the encoding/decoding algorithm utilizes the correlation between the excitation spectrum of the high-frequency band signal and the excitation spectrum of the low-frequency band signal when the class of the high-frequency band signal of the current frame is the predicted class, it may be considered, during signal classification, that the class of the high-frequency band signal for which the excitation spectrum of the high-frequency band signal is strongly correlated to the excitation spectrum of the low-frequency band signal may be determined as the predicted class.

3. When the class of the high-frequency band signal of the current frame is a transient class, the processing manner for the excitation spectrum is similar to the noise class, so the details are not described herein again. The difference lies in that, the encoder needs to send both time-domain envelopes of sub-frames and frequency-domain envelopes of sub-bands of the high-frequency band signal to the decoder. The decoder recovers the high-frequency band signal according to the above information sent by the encoder.

4. When the class of the high-frequency band signal of the current frame is a harmonic class, the processing manner for the excitation spectrum is basically similar to the noise class, so the details will not be described herein again. The difference lies in that, the encoder needs to send frequency-domain envelopes of sub-bands of the high-frequency band signal to the decoder. The decoder recovers the high-frequency band signal according to the above information sent by the encoder.

5. When the class of the high-frequency band signal of the current frame is a normal class, the processing manner for the excitation spectrum is similar to that for the noise class, so the details are not described herein again. The difference lies in that, the encoder needs to send frequency-domain envelopes of sub-bands of the high-frequency band signal to the decoder. The decoder recovers the high-frequency band signal according to the above information sent by the encoder.

Referring to FIG. 1, an embodiment of the present invention provides a signal classification method, where the method specifically includes:

101: Divide a current frame into a low-frequency band signal and a high-frequency band signal.

The embodiment of the present invention is implemented by an encoder.

Specifically, the low-frequency band signal and the high-frequency band signal are relative concepts, and generally, a current frame is divided by a quadrature minor filter (Quadrature Minor Filter, QMF from the center frequency of the current frame into a low-frequency band signal and a high-frequency band signal. However, the present invention is not limited thereto, and the current frame may also be divided from other frequencies into a low-frequency band signal and a high-frequency band signal in other processing manners

102: Determine, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter. The signal class corresponding to the encoding/decoding characteristic parameter is a signal class having encoding/decoding characteristics represented by the encoding/decoding characteristic parameter.

That is, it is determined, according to the value requirement of the preset encoding/decoding characteristic parameter corresponding to the signal class, whether a value of the encoding/decoding characteristic parameter of the current frame corresponding to the signal class meets the value requirement of the encoding/decoding characteristic parameter.

The preset encoding/decoding characteristic parameter corresponding to the signal class includes at least one of: an encoding/decoding characteristic parameter corresponding to a noise class, an encoding/decoding characteristic parameter corresponding to a predicted class, and an encoding/decoding characteristic parameter corresponding to a harmonic class.

The encoding/decoding characteristic parameter corresponding to the noise class is one of: a correlation parameter between an amplitude of a low-frequency band frequency-domain signal and an amplitude of a high-frequency band frequency-domain signal, and a correlation parameter between energy of the low-frequency band frequency-domain signal and energy of the high-frequency band frequency-domain signal; where, the encoding/decoding characteristic parameter corresponding to the noise class is not limited to the correlation parameter between the amplitude (or energy) of the low-frequency band frequency-domain signal and the amplitude (or energy) of the high-frequency band frequency-domain signal, but may be correlation parameters between other feature values of the low-frequency band frequency-domain signal and other feature values of the high-frequency band frequency-domain signal, which does not influence the implementation of the present invention.

When the encoding/decoding characteristic parameter corresponding to the noise class is the correlation parameter between the amplitude of the low-frequency band frequency-domain signal and the amplitude of the high-frequency band frequency-domain signal, this step is specifically: determining whether the correlation parameter between the amplitude of the low-frequency band frequency-domain signal and the amplitude of the high-frequency band frequency-domain signal of the current frame meets a value requirement of a preset correlation parameter between the amplitude of the low-frequency band frequency-domain signal and the amplitude of the high-frequency band frequency-domain signal; when the encoding/decoding characteristic parameter corresponding to the noise class is the correlation parameter between the energy of the low-frequency band frequency-domain signal and the energy of the high-frequency band frequency-domain signal, this step is specifically: determining whether the correlation parameter between the energy of the low-frequency band frequency-domain signal and the energy of the high-frequency band frequency-domain signal of the current frame meets a value requirement of a preset correlation parameter between the energy of the low-frequency band frequency-domain signal and the energy of the high-frequency band frequency-domain signal.

The value requirement of the preset encoding/decoding characteristic parameter corresponding to the noise class may specifically be greater than a certain threshold, or within a value range. The value requirement of the correlation parameter between the amplitude of the low-frequency band frequency-domain signal and the amplitude of the high-frequency band frequency-domain signal and the value requirement of the correlation parameter between the energy of the low-frequency band frequency-domain signal and the energy of the high-frequency band frequency-domain signal may be the same or different.

The encoding/decoding characteristic parameter corresponding to the predicted class is one of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low frequency excitation spectrum and a frequency-domain coefficient of a high frequency excitation spectrum, and a correlation parameter between an absolute value of the frequency-domain coefficient of the low frequency excitation spectrum and an absolute value of the frequency-domain coefficient of the high frequency excitation spectrum. The encoding/decoding characteristic parameter corresponding to the predicted class is not limited to the above correlation parameters, but may be correlation parameters between other feature values of the low-frequency band signal and other feature values of the high-frequency band signal, or correlation parameters between other feature values of the low-frequency band excitation spectrum and other feature values of the high frequency excitation spectrum, which does not influence the implementation of the present invention.

When the encoding/decoding characteristic parameter corresponding to the predicted class is the correlation parameter between the frequency-domain coefficient of the low-frequency band signal and the frequency-domain coefficient of the high-frequency band signal, this step is specifically: determining whether the correlation parameter between the frequency-domain coefficient of the low-frequency band signal and the frequency-domain coefficient of the high-frequency band signal of the current frame meets a value requirement of a preset correlation parameter between the frequency-domain coefficient of the low-frequency band signal and the frequency-domain coefficient of the high-frequency band signal. When the encoding/decoding characteristic parameter corresponding to the predicted class is the correlation parameter between the absolute value of the frequency-domain coefficient of the low-frequency band signal and the absolute value of the frequency-domain coefficient of the high-frequency band signal, this step is specifically: determining whether the correlation parameter between the absolute value of the frequency-domain coefficient of the low-frequency band signal and the absolute value of the frequency-domain coefficient of the high-frequency band signal of the current frame meets a value requirement of a preset correlation parameter between the absolute value of the frequency-domain coefficient of the low-frequency band signal and the absolute value of the frequency-domain coefficient of the high-frequency band signal. When the encoding/decoding characteristic parameter corresponding to the predicted class is the correlation parameter between the frequency-domain coefficient of the low frequency excitation spectrum and the frequency-domain coefficient of the high frequency excitation spectrum, this step is specifically: determining whether the correlation parameter between the frequency-domain coefficient of the low frequency excitation spectrum and the frequency-domain coefficient of the high frequency excitation spectrum of the current frame meets a value requirement of a preset correlation parameter between the frequency-domain coefficient of the low frequency excitation spectrum and the frequency-domain coefficient of the high frequency excitation spectrum. When the encoding/decoding characteristic parameter corresponding to the predicted class is the correlation parameter between the absolute value of the frequency-domain coefficient of the low frequency excitation spectrum and the absolute value of the frequency-domain coefficient of the high-frequency band excitation spectrum, this step is specifically: determining whether the correlation parameter between the absolute value of the frequency-domain coefficient of the low-frequency band excitation spectrum and the absolute value of the frequency-domain coefficient of the high-frequency band excitation spectrum meets a value requirement of a preset correlation parameter between the absolute value of the frequency-domain coefficient of the low-frequency band excitation spectrum and the absolute value of the frequency-domain coefficient of the high-frequency band excitation spectrum.

The value requirement of the preset encoding/decoding characteristic parameter corresponding to the predicted class may specifically be greater than a certain threshold, or within a value range. The value requirement of the correlation parameter between the frequency-domain coefficient of the low-frequency band signal and the frequency-domain coefficient of the high-frequency band signal, the value requirement of the correlation parameter between the absolute value of the frequency-domain coefficient of the low-frequency band signal and the absolute value of the frequency-domain coefficient of the high-frequency band signal, the value requirement of the correlation parameter between the frequency-domain coefficient of the low-frequency band excitation spectrum and the frequency-domain coefficient of the high-frequency band excitation spectrum, and the value requirement of the correlation parameter between the absolute value of the frequency-domain coefficient of the low-frequency band excitation spectrum and the absolute value of the frequency-domain coefficient of the high-frequency band excitation spectrum may be the same or different, which does not influence the implementation of the present invention.

The encoding/decoding characteristic parameter corresponding to the harmonic class is one of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low-frequency band excitation spectrum and a frequency-domain coefficient of a high-frequency band excitation spectrum, and a correlation parameter between an absolute value of the frequency-domain coefficient of the low-frequency band excitation spectrum and an absolute value of the frequency-domain coefficient of the high-frequency band excitation spectrum, and the relevant description is the same as that of the value requirement of the encoding/decoding characteristic parameter corresponding to the predicted class, so the details will not be described herein again.

It should be noted that, the signal class in the preset encoding/decoding characteristic parameter corresponding to the signal class is not limited to the above classes, but encoding/decoding characteristic parameters corresponding to other signal classes may also be preset, which does not influence the implementation of the present invention.

103: Determine a signal class of the high-frequency band signal of the current frame according to a determining result.

In an implementation, when a value of the encoding/decoding characteristic parameter of the current frame corresponding to the noise class meets the value requirement of the preset encoding/decoding characteristic parameter corresponding to the noise class, it is determined that the signal class of the high-frequency band signal of the current frame is the noise class. In an exemplary implementation, when the number of sub-bands having a peak-to-average ratio smaller than a second threshold is greater than a second predetermined number, and a value of the encoding/decoding characteristic parameter of the current frame corresponding to the noise class meets the value requirement of the preset encoding/decoding characteristic parameter corresponding to the noise class, it is determined that the signal class of the high-frequency band signal of the current frame is the noise class.

In an implementation, if the preset encoding/decoding characteristic parameter corresponding to the signal class includes the encoding/decoding characteristic parameter corresponding to the predicted class, or the encoding/decoding characteristic parameter corresponding to the harmonic class, when the encoding/decoding characteristic parameter of the current frame corresponding to the predicted class meets the value requirement of the preset encoding/decoding characteristic parameter corresponding to the predicted class, it is determined that the signal class of the high-frequency band signal of the current frame is the predicted class. Alternatively, when the encoding/decoding characteristic parameter of the current frame corresponding to the harmonic class meets a value requirement of a preset encoding/decoding characteristic parameter corresponding to the harmonic class, it is determined that the signal class of the high-frequency band signal of the current frame is the harmonic class. In an exemplary implementation, when the number of sub-bands having a peak-to-average ratio greater than a first threshold is greater than a first predetermined number, and the encoding/decoding characteristic parameter of the current frame corresponding to the harmonic class meets the value requirement of the preset encoding/decoding characteristic parameter corresponding to the harmonic class, it is determined that the signal class of the high-frequency band signal of the current frame is the harmonic class; or, when the number of sub-bands having a peak-to-average ratio greater than the first threshold is not greater than the first predetermined number, and the encoding/decoding characteristic parameter of the current frame corresponding to the predicted class meets the value requirement of the preset encoding/decoding characteristic parameter corresponding to the predicted class, it is determined that the signal class of the high-frequency band signal of the current frame is the predicted class; or, alternatively, when the number of sub-bands having a peak-to-average ratio greater than the first threshold is not greater than the first predetermined number, the number of sub-bands having a peak-to-average ratio smaller than the second threshold is not greater than the second predetermined number, and the encoding/decoding characteristic parameter of the current frame corresponding to the predicted class meets the value requirement of the preset encoding/decoding characteristic parameter corresponding to the predicted class, it is determined that the signal class of the high-frequency band signal of the current frame is the predicted class.

In an implementation, if the preset encoding/decoding characteristic parameter corresponding to the signal class includes the encoding/decoding characteristic parameter corresponding to the predicted class, and the encoding/decoding characteristic parameter corresponding to the harmonic class, when the number of sub-bands having a peak-to-average ratio greater than the first threshold is greater than the first predetermined number, and the encoding/decoding characteristic parameter of the current frame corresponding to the harmonic class meets the value requirement of the preset encoding/decoding characteristic parameter corresponding to the harmonic class, it is determined that the signal class of the high-frequency band signal of the current frame is the harmonic class; when the number of sub-bands having a peak-to-average ratio greater than the first threshold is not greater than the first predetermined number, the number of sub-bands having a peak-to-average ratio smaller than the second threshold is not greater than the second predetermined number, and the encoding/decoding characteristic parameter of the current frame corresponding to the predicted class meets the value requirement of the preset encoding/decoding characteristic parameter corresponding to the predicted class, it is determined that the signal class of the high-frequency band signal of the current frame is the predicted class. The first threshold and the second threshold may be the same or different.

In still another implementation, a full-frequency time-domain signal of the current frame is divided into N sub-frames, and when energy of one sub-frame is greater than a certain number of times of energy of a previous sub-frame of the sub-frame, it is determined that the signal class of the high-frequency band signal of the current frame is a transient class.

In the embodiment of the present invention, during signal classification, it is determined according to a value requirement of a preset encoding/decoding characteristic parameter corresponding to a signal class, whether a value of an encoding/decoding characteristic parameter of a current frame meets the value requirement of the encoding/decoding characteristic parameter, so as to determine whether a signal class of a high-frequency band signal of the current frame is the signal class corresponding to the encoding/decoding characteristic parameter, and in this way, encoding/decoding characteristics of different signal classes are taken into consideration during signal classification, thereby making the signal classification more accurate.

To make the technical solution provided in the embodiment of the present invention clearer, the technical solution is described in detail below through the following embodiment:

201: The encoder divides a full-frequency time-domain signal of the current frame into N sub-frames.

202: The encoder calculates energy or amplitude of each sub-frame.

203: The encoder determines whether a specified sub-frame exists in the current frame, and if yes, perform step 204; if not, perform step 205. Energy of the specified sub-frame is greater than a certain number of times of energy of a previous sub-frame of the specified sub-frame, or amplitude of the specified sub-frame is greater than a certain number of times of amplitude of the previous sub-frame of the specified sub-frame.

For example, energy of a certain sub-frame in the current frame in the encoder is $E_{cur}$, energy of a previous sub-frame of the sub-frame is $E_{prev}$, a predetermined number of times is preset at the encoder and is assumed to be a, and generally, a>5; if $E_{cur}>a\times E_{prev}$, the sub-frame is the specified sub-frame.

204: The encoder determines that the signal class of the high-frequency band signal of the current frame is the transient class, and the process is ended.

Because one sub-frame includes a high-frequency band part and a low-frequency band part, and generally energy of the low-frequency band part is greater than that of the high-frequency band part, it is assumed that, for two sequential sub-frames, that is, a sub-frame 1 and a sub-frame 2, energy of the high-frequency band part of the sub-frame 1 is 1, energy of the high-frequency band part of the sub-frame 2 is 6, energy of the low-frequency band part of the sub-frame 1 is 100, energy of the low-frequency band part of the sub-frame 2 is 100, energy of the sub-frame 1 is 101, and energy of the sub-frame 2 is 106; assuming that a predetermined number of times is 5, by adopting the solution of step 203, the energy of the sub-frame 2 is not greater than the predetermined number of times of the energy of the sub-frame 1, and therefore, the sub-frame 2 is not the specified sub-frame. A solution in the prior art is to determine whether the specified sub-frame exists in the high-frequency band signal of the current frame, and according to the solution in the prior art, the high-frequency band energy of the sub-frame 2 is greater than the predetermined number of times of the high-frequency band energy of the sub-frame 1, and therefore, the sub-frame 2 is the specified sub-frame. In this way, in view of the whole frequency band of a data frame, only when there is a significant energy jump between the high-frequency band parts of neighboring sub-frames, it may be determined that the data frame is of the transient class; it can be seen that the technical solution of determining whether the data frame is of the transient class according to the embodiment of the present invention provides a more accurate signal classification result.

205: The encoder divides a high-frequency band frequency-domain signal of the current frame into M sub-bands.

Before step 205, the encoder needs to divide the current frame into a low-frequency band signal and a high-frequency band signal.

206: The encoder determines whether the number of sub-bands having a peak-to-average ratio greater than a first threshold in the high-frequency band frequency-domain signal of the current frame is greater than a first predetermined number, and if yes, perform step 207; if not, perform step 208.

207: The encoder determines that the signal class of the high-frequency band signal of the current frame is the harmonic class, and the process is ended.

208: The encoder determines whether the number of sub-bands having a peak-to-average ratio smaller than a second threshold in the high-frequency band frequency-domain signal of the current frame is greater than a second predetermined number, and if yes, perform step 209; if not, perform step 211.

The first predetermined number and the second predetermined number are empirical values obtained through experience, and may be the same or different.

209: The encoder obtains a correlation parameter between energy or amplitude of the high-frequency band frequency-domain signal and energy or amplitude of the low-frequency band frequency-domain signal of the current frame, and determines whether a value of the correlation parameter between the energy or amplitude of the high-frequency band frequency-domain signal and the energy or amplitude of the low-frequency band frequency-domain signal of the current frame is greater than a predetermined energy threshold or amplitude threshold, and if yes, perform step 210; if not, perform step 211.

The specific process of obtaining the value the correlation parameter between the energy or amplitude of the high-frequency band frequency-domain signal and the energy or amplitude of the low-frequency band frequency-domain signal of the current frame includes, but is not limited to, the following two manners First manner The encoder obtains values of correlation parameters between energy or amplitude of sub-bands of the high-frequency band signal and energy or amplitude of sub-bands of the low-frequency band signal respectively corresponding to the sub-bands, calculates a mean of the obtained values of the correlation parameters, and uses the mean as the value of the correlation parameter between the energy or amplitude of the high-frequency band frequency-domain signal and the energy or amplitude of the low-frequency band frequency-domain signal of the current frame.

In this manner, the encoder and the decoder already predetermine a mapping relationship between a certain sub-band of the high-frequency band signal and a certain sub-band of the low-frequency band signal, and accordingly, the encoder determines, according to the mapping relationship, a value of a correlation parameter between energy or amplitude of a certain sub-band of the high-frequency band signal and a sub-band of the low-frequency band signal corresponding to the sub-band, calculates by analogy values of correlation parameters between energy or amplitude of sub-bands of the high frequency band and energy or amplitude of corresponding sub-bands of the low frequency band, and then obtains a mean of the calculated values of the correlation parameters, so as to obtain the value of the correlation parameter between the energy or amplitude of the high-frequency band frequency-domain signal and the energy or amplitude of the low-frequency band frequency-domain signal.

In this manner, the encoder may specifically obtain values of correlation parameters between energy or amplitude of sub-bands of the high-frequency band signal and energy or amplitude of sub-bands of the low-frequency band signal respectively corresponding to the sub-bands, according to ratios of energy or amplitude of sub-bands of the high-frequency band signal to energy or amplitude of sub-bands of the low-frequency band signal respectively corresponding to the sub-bands, and generally, if the ratio is close to 1, it indicates a strong correlation between the two, and the value of the correlation parameter is large, otherwise, it indicates a weak correlation between the two, and the value of the correlation parameter is small; or, may calculate the values of the correlation parameters according to absolute values of differences between energy or amplitude of sub-bands of the high-frequency band signal and energy or amplitude of sub-bands of the low-frequency band signal respectively corresponding to the sub-bands, and generally, if the absolute value is small, it indicates a strong correlation between the two, and the value of the correlation parameter is large, otherwise, it indicates a weak correlation between the two, and the value of the correlation parameter is small.

Second manner: The encoder respectively determines a sub-band of the low-frequency band signal that is most correlated to energy or amplitude of each sub-band of the high-frequency band signal, obtains a value of a correlation parameter between energy or amplitude of each sub-band of the high-frequency band signal and energy or amplitude of the determined most correlated sub-band of the low-frequency band signal, calculates a mean of the obtained values of the correlation parameters, and uses the mean as the value of the correlation parameter between the energy or amplitude of the high-frequency band frequency-domain signal and the energy or amplitude of the low-frequency band frequency-domain signal of the current frame.

This manner is described below by using an example.

It is assumed that, the high-frequency band signal includes 10 sub-bands, the low-frequency band signal includes 10 sub-bands, a sub-band that is most correlated to energy or amplitude of the first sub-band of the high frequency band is searched from sub-bands of the low-frequency band signal, and a value of a correlation parameter between the two sub-bands is obtained; likewise, a sub-band that is most correlated to energy or amplitude of the second sub-band of the high frequency band is searched from the sub-bands of the low frequency band, and a value of a correlation parameter between the two sub-bands is obtained, and in this way, 10 correlation parameter values are obtained by analogy, and a mean of the 10 correlation parameters is calculated and used as the value of the correlation parameter between the energy or amplitude of the high-frequency band frequency-domain signal and the energy or amplitude of the low-frequency band frequency-domain signal.

In this manner, the specific manner of obtaining the values of the correlation parameters between the energy or amplitude of the sub-bands of the high-frequency band signal and the energy or amplitude of the most correlated sub-bands of the low-frequency band signal is similar to the first manner, so the details will not be described herein again.

The number of sub-bands may be 1 or more, and when the number of sub-band is 1, the value of the correlation parameter is directly calculated for the whole frequency band.

210: The encoder determines that the signal class of the high-frequency band signal of the current frame is the noise class, and the process is ended.

211: The encoder obtains a value of a correlation parameter between a frequency-domain coefficient of a high-frequency band excitation spectrum and a frequency-domain coefficient of a low-frequency band excitation spectrum of the current frame, and determines whether the value of the correlation parameter between the frequency-domain coefficient of the high-frequency band excitation spectrum and the frequency-domain coefficient of the low-frequency band excitation spectrum is greater than a certain predetermined threshold, and if yes, perform step 212; if not, perform step 213.

The value of the correlation parameter between the frequency-domain coefficient of the high-frequency band excitation spectrum and the frequency-domain coefficient of the low-frequency band excitation spectrum of the current frame may be obtained by using a normalized cross-correlation algorithm.

In an implementation, the value of the correlation parameter between the frequency-domain coefficient of the high-frequency band excitation spectrum and the frequency-domain coefficient of the low-frequency band excitation spectrum of the current frame may be obtained in the following manner the encoder respectively determines a sub-band of the low-frequency band signal that is most correlated to a frequency-domain coefficient of an excitation spectrum of each sub-band of the high-frequency band signal of the current frame; obtains a value of a correlation parameter between the frequency-domain coefficient of the excitation spectrum of each sub-band of the high-frequency band signal and an frequency-domain coefficient of an excitation spectrum of the determined most correlated sub-band of the low-frequency band signal, and calculates a mean of the obtained values of the correlation parameters, so as to obtain the value of the correlation parameter between the frequency-domain coefficient of the high-frequency band excitation spectrum and the frequency-domain coefficient of the low-frequency band excitation spectrum of the current frame.

It is assumed that the high-frequency band excitation spectrum includes 2 sub-bands, the low-frequency band excitation spectrum includes 5 sub-bands, each sub-band of the high frequency band includes 20 frequency-domain coefficients, and each sub-band of the low frequency band includes 40 frequency-domain coefficients. By using the following equation, normalized correlation parameter values of 1st-20th frequency-domain coefficients, 2nd-21st frequency-domain coefficients, 3rd-22nd frequency-domain coefficients, . . . , and 21st-40th frequency-domain coefficients in 40 frequency-domain coefficients of each sub-band of the low-frequency band signal and 20 frequency-domain coefficients of the first sub-band of the high frequency band are determined, and a maximum value among the determined normalized correlation parameter values is obtained; likewise, normalized correlation parameter values of the 1st-20th frequency-domain coefficients, 2nd-21st frequency-domain coefficients, 3rd-22nd frequency-domain coefficients, . . . , and 21st-40th frequency-domain coefficients in the 40 frequency-domain coefficients of each sub-band of the low-frequency band signal and 20 frequency-domain coefficients of the second sub-band of the high frequency band are determined, and a maximum value among the determined normalized correlation parameter values is obtained; a mean of the two maximum values is calculated, so as to obtain the value of the correlation parameter between the frequency-domain coefficient of the high-frequency band excitation spectrum and the frequency-domain coefficient of the low-frequency band excitation spectrum of the current frame.

$$\left\{\sum_{i=1}^{20}(a_i * b_i) \Big/ \sqrt{\sum_{i=1}^{20} a_i^2 * \sum_{j=1}^{20} b_j^2}\right\}$$

Here, $a_i$ and $b_i$ are respectively a certain frequency-domain coefficient in a sub-band of the low-frequency band signal and a certain frequency-domain coefficient of a sub-band of the high-frequency band signal, for example, when normalized correlation parameter values of 2nd-21st frequency-domain coefficients of a certain sub-band of the low-frequency band signal and 20 frequency-domain coefficients of the high-frequency band signal are calculated, $a_1$ is the 2nd frequency-domain coefficient of a certain sub-band of the low-frequency band signal, $a_2$ is the 3rd frequency-domain coefficient of the sub-band, $a_{20}$ is the 21st frequency-domain coefficient of the sub-band, and $b_1$ to $b_{20}$ are 20 frequency-domain coefficients in a certain sub-band of the high-frequency band signal.

Alternatively, in another implementation, the encoder in this step may also obtain a value of a correlation parameter between an absolute value of the frequency-domain coefficient of the high-frequency band excitation spectrum and an absolute value of the frequency-domain coefficient of the low-frequency band excitation spectrum of the current frame, and determine whether the value of the correlation parameter between the absolute value of the frequency-domain coefficient of the high-frequency band excitation spectrum and the absolute value of the frequency-domain coefficient of the low-frequency band excitation spectrum is greater than a certain threshold, and if yes, perform step 212; if not, perform step 213.

212: The encoder determines that the signal class of the high-frequency band signal of the current frame is the predicted class, and the process is ended.

213: The encoder determines that the signal class of the high-frequency band signal of the current frame is the normal class.

It should be noted that, the order of the above determination steps is not fixed, but may be changed, for example, step 206-step 211 may be performed first, and when step 211 is performed, if the determining result is yes, step 212 is performed, and if the determining result is not, step 201-204 is performed, where when the determining result of step 203 is yes, it is determined that the signal class of the high-frequency band signal of the current frame is the transient class, and when the determining result of step 203 is not, it is determined that the signal class of the high-frequency band signal of the current frame is the normal class.

In the embodiment of the present invention, during signal classification, encoding/decoding characteristics of the high-frequency band signal of the current frame are taken into consideration, so that when energy or amplitude of the high-frequency band frequency-domain signal and energy or amplitude of the low-frequency band frequency-domain signal of the current frame are strongly correlated, the high-frequency band signal is classified into the noise class; when the frequency-domain coefficient of the high-frequency band excitation spectrum and the frequency-domain coefficient of the low-frequency band excitation spectrum of the current frame are strongly correlated, the high-frequency band signal is classified into the predicted class, thereby making the signal classification more accurate, while in the prior art, the class is determined only according to the peak-to-average ratio, and encoding/decoding characteristics of the signal class are not taken into consideration, and therefore, data frames having encoding/decoding characteristics of the noise class may be classified into the normal class, resulting in an inaccurate classification result; further, when it is determined whether the high-frequency band signal of the current frame is of the transient class, determination is performed based on sub-frames of the full-frequency band of the current frame, but is not performed only based on sub-bands in the high-frequency band signal, thereby providing a more accurate determining result. Further, because the signal classification is more accurate, the encoding/decoding performance is improved when the same number of bits is used, for example, it is determined by the signal classification method in the prior art that the signal class of the high-frequency band signal of a certain frame is the normal class, while it is determined by the signal classification method provided in the present application that the signal class of the high-frequency band signal of the frame is the noise class, and if the encoder and the decoder predetermine a mapping relationship between a certain sub-band of the high-frequency band signal and a certain sub-band of the low-frequency band signal, the encoder only needs to send a ratio of energy or amplitude of the sub-band of the high-frequency band signal to energy or amplitude of the sub-band of the low-frequency band signal, and does not need to transmit other information, thereby reducing the number of bits.

Alternatively, in another implementation, in step 211, the encoder may obtain a value of a correlation parameter between a frequency-domain coefficient of the high-frequency band signal of the current frame and a frequency-domain coefficient of the low-frequency band signal, and determine whether the value of the correlation parameter between the frequency-domain coefficient of the high-frequency band signal and the frequency-domain coefficient of the low-frequency band signal is greater than a certain threshold, and if yes, perform step 212; if not, perform step 213. Specifically, the value of the correlation parameter between the frequency-domain coefficient of the high-frequency band signal and the frequency-domain coefficient of the low-frequency band signal of the current frame may be obtained in the following manner the encoder respectively determines a sub-band of the low-frequency band signal that is most correlated to a frequency-domain coefficient of each sub-band of the high-frequency band signal of the current frame; obtains a value of a correlation parameter between the frequency-domain coefficient of each sub-band of the high-frequency band signal and the frequency-domain coefficient of the determined sub-band of the low-frequency band signal that is most correlated to the sub-band, calculates a mean of the obtained values of the correlation parameters, and uses the mean as the value of the correlation parameter between the frequency-domain coefficient of the high-frequency band signal and the frequency-domain coefficient of the low-frequency band signal of the current frame.

Alternatively, in another implementation, in step 211, the encoder may obtain a value of a correlation parameter between an absolute value of the frequency-domain coefficient of the high-frequency band signal and an absolute value of the frequency-domain coefficient of the low-frequency band signal of the current frame, and determine whether the value of the correlation parameter between the absolute value of the frequency-domain coefficient of the high-frequency band signal and the absolute value of the frequency-domain coefficient of the low-frequency band signal is greater than a certain threshold, and if yes, perform step 212; if not, perform step 213.

Alternatively, in another implementation, when the number of sub-bands having a peak-to-average ratio smaller than the second threshold is greater than the second predetermined number, and a value of the encoding/decoding characteristic parameter of the current frame corresponding to the noise class meets the value requirement of the preset encoding/decoding characteristic parameter corresponding to the noise class (that is, the correlation parameter between the amplitude of the low-frequency band frequency-domain signal and the amplitude of the high-frequency band frequency-domain signal of the current frame meets the preset value requirement, or the correlation parameter between the energy of the low-frequency band frequency-domain signal and the energy of the high-frequency band frequency-domain signal meets the preset value requirement), it is determined that the signal class of the high-frequency band signal of the current frame is the noise class.

When the number of sub-bands having a peak-to-average ratio greater than the first threshold is greater than the first predetermined number, and the value of the encoding/decoding characteristic parameter of the current frame corresponding to the harmonic class meets the value requirement of the preset encoding/decoding characteristic parameter corresponding to the harmonic class (that is, the correlation parameter between the frequency-domain coefficient of the low-frequency band signal and the frequency-domain coefficient of the high-frequency band signal, or, the correlation parameter between the absolute value of the frequency-domain coefficient of the low-frequency band signal and the absolute value of the frequency-domain coefficient of the high-frequency band signal, or, the correlation parameter between the frequency-domain coefficient of the low-frequency band excitation spectrum and the frequency-domain coefficient of the high-frequency band excitation spectrum, or, the correlation parameter between the absolute value of the frequency-domain coefficient of the low-frequency band excitation spectrum and the absolute value of the frequency-domain coefficient of the high-frequency band excitation spectrum meets the preset value requirement), it is determined that the signal class of the high-frequency band signal of the current frame is the harmonic class.

When the number of sub-bands having a peak-to-average ratio greater than the first threshold is not greater than the first predetermined number, when the number of sub-bands having a peak-to-average ratio smaller than the second threshold is not greater than the second predetermined number, and the value of the encoding/decoding characteristic parameter of the current frame corresponding to the predicted class meets the value requirement of the preset encoding/decoding characteristic parameter corresponding to the predicted class (that is, the correlation parameter between the frequency-domain coefficient of the low-frequency band signal and the frequency-domain coefficient of the high-frequency band signal, or, the correlation parameter between the absolute value of the frequency-domain coefficient of the low-frequency band signal and the absolute value of the frequency-domain coefficient of the high-frequency band signal, or, the correlation parameter between the frequency-domain coefficient of the low-frequency band excitation spectrum and the frequency-domain coefficient of the high-frequency band excitation spectrum, or, the correlation parameter between the absolute value of the frequency-domain coefficient of the low-frequency band excitation spectrum and the absolute value of the frequency-domain coefficient of the high-frequency band excitation spectrum meets the preset value requirement), it is determined that the signal class of the high-frequency band signal of the current frame is the predicted class.

When it is already determined by using the above technical solution that a data frame does not belong to the transient class, the noise class, the harmonic class and the predicted class, it may be determined that the data frame belongs to the normal class.

The value requirement of the encoding/decoding characteristic parameter corresponding to the harmonic class and the value requirement of the encoding/decoding characteristic parameter corresponding to the predicted class may be the same or different, which does not influence the implementation of the present invention.

Figure 3:
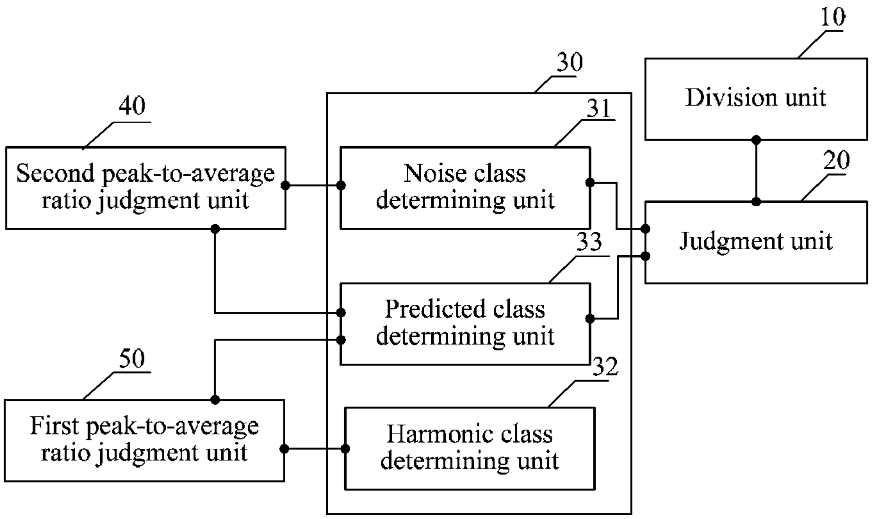
FIG. 3 is a structural diagram of a signal classification device provided in an embodiment of the present invention.

Referring to FIG. 3, an embodiment of the present invention provides a signal classification device, where the device specifically includes:

a division unit 10, configured to divide a current frame into a low-frequency band signal and a high-frequency band signal;

a judgment unit 20, configured to determine, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter; that is, the judgment unit 20 determines according to the value requirement of the preset encoding/decoding characteristic parameter corresponding to the signal class, whether a value of the encoding/decoding characteristic parameter of the current frame corresponding to the signal class meets the value requirement of the encoding/decoding characteristic parameter; and a determination unit 30, configured to determine according to a determining result whether a signal class of the high-frequency band signal of the current frame is a signal class corresponding to the encoding/decoding characteristic parameter, where the signal class corresponding to the encoding/decoding characteristic parameter is a signal class having encoding/decoding characteristics represented by the encoding/decoding characteristic parameter.

In an implementation, the preset encoding/decoding characteristic parameter corresponding to the signal class includes an encoding/decoding characteristic parameter corresponding to a noise class, where the encoding/decoding characteristic parameter corresponding to the noise class is one of: a correlation parameter between an amplitude of a low-frequency band frequency-domain signal and an amplitude of a high-frequency band frequency-domain signal, and a correlation parameter between energy of the low-frequency band frequency-domain signal and energy of the high-frequency band frequency-domain signal. At this time, the signal classification device may further include: a second peak-to-average ratio judgment unit 40, configured to determine whether the number of sub-bands having a peak-to-average ratio smaller than a second threshold in the high-frequency band signal of the current frame is greater than a second predetermined number; and the determination unit includes: a noise class determining unit 31, configured to determine that the signal class of the high-frequency band signal of the current frame is the noise class, when the number of sub-bands having a peak-to-average ratio smaller than the second threshold is greater than the second predetermined number, and a value of the encoding/decoding characteristic parameter of the current frame corresponding to the noise class meets the value requirement of the preset encoding/decoding characteristic parameter corresponding to the noise class. Alternatively, the signal classification device may not include the second peak-to-average ratio judgment unit 40, and other devices or chips are used to determine whether the number of sub-bands having a peak-to-average ratio smaller than the second threshold in the high-frequency band signal of the current frame is greater than the second predetermined number, and notify the signal classification device of the determining result.

In another implementation, the preset encoding/decoding characteristic parameter corresponding to the signal class includes an encoding/decoding characteristic parameter corresponding to a predicted class, or an encoding/decoding characteristic parameter corresponding to a harmonic class, where the corresponding description of the encoding/decoding characteristic parameter corresponding to the predicted class and the encoding/decoding characteristic parameter corresponding to the harmonic class is the same as that in the method embodiment, so the details will not be described herein again. The signal classification device may further include: a first peak-to-average ratio judgment unit 50, configured to determine whether the number of sub-bands having a peak-to-average ratio greater than a first threshold in the high-frequency band signal of the current frame is greater than a first predetermined number; and when the preset encoding/decoding characteristic parameter corresponding to the signal class includes the encoding/decoding characteristic parameter corresponding to the harmonic class, the determination unit includes: a harmonic class determining unit 32, configured to determine that the signal class of the high-frequency band signal of the current frame is the harmonic class, when the number of sub-bands having a peak-to-average ratio greater than the first threshold is greater than the first predetermined number, and a value of the encoding/decoding characteristic parameter of the current frame corresponding to the harmonic class meets the value requirement of the preset encoding/decoding characteristic parameter corresponding to the harmonic class. When the preset encoding/decoding characteristic parameter corresponding to the signal class includes the encoding/decoding characteristic parameter corresponding to the predicted class, the determination unit includes: a predicted class determining unit 33, configured to determine that the signal class of the high-frequency band signal of the current frame is the predicted class, when the number of sub-bands having a peak-to-average ratio greater than the first threshold is not greater than the first predetermined number, and a value of the encoding/decoding characteristic parameter of the current frame corresponding to the predicted class meets the value requirement of the preset encoding/decoding characteristic parameter corresponding to the predicted class. Alternatively, the signal classification device may not include the first peak-to-average ratio judgment unit 50, and other devices or chips are used to determine whether the number of sub-bands having a peak-to-average ratio greater than the first threshold in the high-frequency band signal of the current frame is greater than the first predetermined number, and notify the signal classification device of the determining result. In an exemplary implementation, the predicted class determining unit is specifically configured to determine that the signal class of the high-frequency band signal of the current frame is the predicted class, when the number of sub-bands having a peak-to-average ratio smaller than the second threshold is not greater than the second predetermined number, the number of sub-bands having a peak-to-average ratio greater than the first threshold is not greater than the first predetermined number, and a value of the encoding/decoding characteristic parameter of the current frame corresponding to the predicted class meets the value requirement of the preset encoding/decoding characteristic parameter corresponding to the predicted class. At this time, the signal classification device may further include: a second peak-to-average ratio judgment unit 40, configured to determine whether the number of sub-bands having a peak-to-average ratio smaller than a second threshold in the high-frequency band signal of the current frame is greater than a second predetermined number.

In an implementation, the preset encoding/decoding characteristic parameter corresponding to the signal class includes an encoding/decoding characteristic parameter corresponding to a predicted class, and an encoding/decoding characteristic parameter corresponding to a harmonic class, where the corresponding description of the encoding/decoding characteristic parameter corresponding to the predicted class and the encoding/decoding characteristic parameter corresponding to the harmonic class is the same as that in the method embodiment, so the details are not described herein again. At this time, the signal classification device may further include: a second peak-to-average ratio judgment unit 40, configured to determine whether the number of sub-bands having a peak-to-average ratio smaller than a second threshold in the high-frequency band signal of the current frame is greater than a second predetermined number, and a first peak-to-average ratio judgment unit 50, configured to determine whether the number of sub-bands having a peak-to-average ratio greater than a first threshold in the high-frequency band signal of the current frame is greater than a first predetermined number; and the determination unit includes: a harmonic class determining unit 32, configured to determine that the signal class of the high-frequency band signal of the current frame is the harmonic class, when the number of sub-bands having a peak-to-average ratio greater than the first threshold is greater than the first predetermined number, and a value of the encoding/decoding characteristic parameter of the current frame corresponding to the harmonic class meets the value requirement of the preset encoding/decoding characteristic parameter corresponding to the harmonic class; and a predicted class determining unit 33, configured to determine that the signal class of the high-frequency band signal of the current frame is the predicted class, when the number of sub-bands having a peak-to-average ratio greater than the first threshold is not greater than the first predetermined number, the number of sub-bands having a peak-to-average ratio smaller than the second threshold is not greater than the second predetermined number, and a value of the encoding/decoding characteristic parameter of the current frame corresponding to the predicted class meets the value requirement of the preset encoding/decoding characteristic parameter corresponding to the predicted class. Alternatively, the signal classification device may not include the second peak-to-average ratio judgment unit 40 and the first peak-to-average ratio judgment unit 50, and other devices or chips are used to perform judgment and then notify the signal classification device of the determining result.

Figure 7:
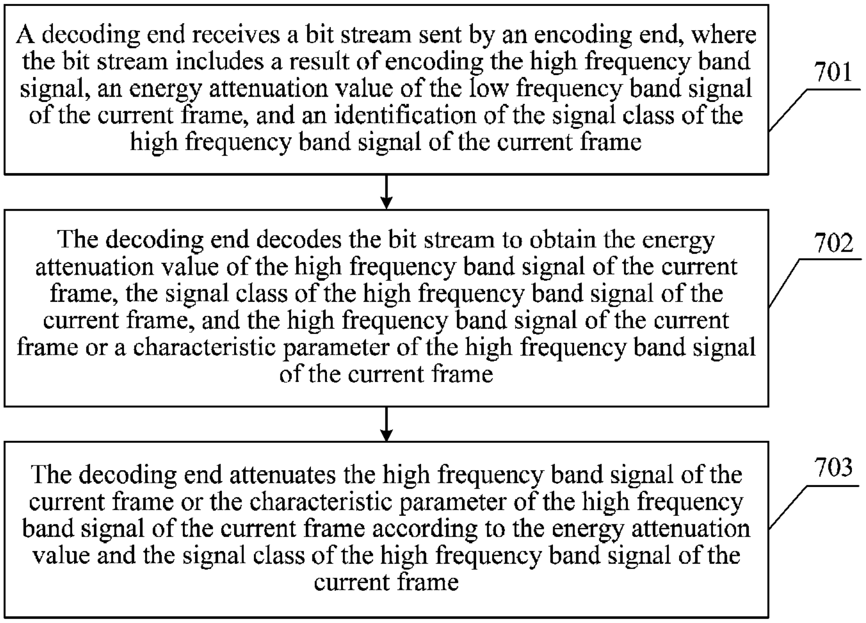
FIG. 7 is a flow chart of another decoding method provided in an embodiment of the present invention.

It should be noted that, although the predicted class determining unit 33, the harmonic class determining unit 32 and the noise class determining unit 31 are drawn in FIG. 7, the determination unit 30 may only include any one or two units in specific implementations.

In still another implementation, the device further includes:

a transient class determining unit, configured to divide a full-frequency time-domain signal of the current frame into N sub-frames, and when energy of one sub-frame is greater than a certain number of times of energy of a previous sub-frame of the sub-frame, determine that the signal class of the high-frequency band signal of the current frame is a transient class.

In the embodiment of the present invention, during signal classification, it is determined whether the signal class of the current frame is the signal class corresponding to the encoding/decoding characteristic parameter by determining whether the value of the encoding/decoding characteristic parameter of the current frame meets the preset requirement, and in this way, encoding/decoding characteristics of different signal classes are taken into consideration during signal classification, thereby making the signal classification more accurate. Further, because the signal classification for a data frame is more accurate, the number of bits transmitted after the data frame is encoded is reduced. If it is determined by the signal classification method in the prior art that a certain data frame is a normal frame, while it is determined by the signal classification method in the present application that the data frame is a noise frame, and if the encoder and the decoder predetermine a mapping relationship between a certain sub-band of the high-frequency band signal and a certain sub-band of the low-frequency band signal, the encoder only needs to send a ratio of the frequency-domain envelope of the sub-band of the high-frequency band signal to the frequency-domain envelope of the sub-band of the low-frequency band signal, and does not need to send information related to excitation spectrums, thereby reducing the number of bits.

The signal classification device may be located at the system side, for example, within a base station, and may specifically be a chip or a software module within the base station. Alternatively, the signal classification device may be located at the terminal side, and may specifically be a chip or a software module.

In band-based encoding/decoding algorithms, generally different algorithms are used for encoding/decoding the low-frequency band signal and encoding/decoding the high-frequency band signal, and generally the algorithm used for encoding/decoding the low-frequency band signal is CELP (Code Excited Linear Prediction, code excited linear prediction), which may specifically be ACELP (Algebraic Code Excited Linear Prediction, algebraic code excited linear prediction), QCELP (Qualcomm Code Excited Linear Prediction) or RCELP (Relaxed code excited linear prediction). Due to the CELP algorithm, the encoder attenuates energy of the low-frequency band signal when encoding the low-frequency band signal. The existing algorithm for encoding/decoding the high-frequency band signal does not attenuate energy of the high-frequency band signal; however, if the energy of the high-frequency band signal is not attenuated, sometimes the signal obtained by the decoder by decoding is unpleasant to hear; therefore, to solve the above technical problem, the following embodiments of the present invention provide encoding and decoding methods and encoding and decoding devices, to attenuate the energy of the high-frequency band signal accordingly.

Figure 4:
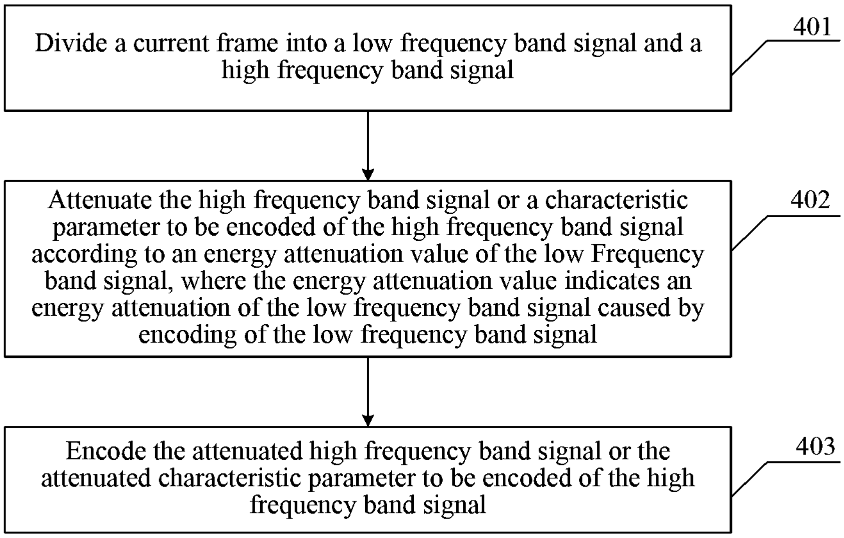
FIG. 4 is a flow chart of an encoding method provided in an embodiment of the present invention.

Referring to FIG. 4, an embodiment of the present invention provides an encoding method, which mainly includes:

401: Divide a current frame into a low-frequency band signal and a high-frequency band signal.

The embodiment of the present invention is implemented by an encoder.

Specifically, the low-frequency band signal and the high-frequency band signal are relative concepts, and generally, an input signal is divided by a QMF filter from the center frequency of the input signal into a low-frequency band signal and a high-frequency band signal by a QMF filter. However, the present invention is not limited thereto, and the input signal may also be divided from other frequencies into a low-frequency band signal and a high-frequency band signal in other processing manners

402: Attenuate the high-frequency band signal or a to-be-encoded characteristic parameter of the high-frequency band signal according to an energy attenuation value of the low-frequency band signal, where the energy attenuation value indicates energy attenuation of the low-frequency band signal caused by encoding of the low-frequency band signal.

Before this step, the method further includes: determining a signal class of the high-frequency band signal of the current frame, where the signal class may be specifically determined by using a signal class determining method provided in the prior art, or the signal class determining method provided in the above embodiments of the present invention, which does not influence the implementation of the present invention.

The high-frequency band signal of the current frame may be a high-frequency band time-domain signal of the current frame or a high-frequency band frequency-domain signal of the current frame; the to-be-encoded characteristic parameter of the high-frequency band signal of the current frame may be an energy to-be-encoded characteristic parameter of the high-frequency band signal, and may specifically be a to-be-encoded time domain envelope or a to-be-encoded frequency domain envelope of the high-frequency band signal of the current frame.

The high-frequency band signal or the to-be-encoded characteristic parameter of the high-frequency band signal may specifically be attenuated according to the energy attenuation value and the signal class of the high-frequency band signal of the current frame. In another implementation, the encoder may attenuate high-frequency band signals of all signal classes or to-be-encoded characteristic parameters of the high-frequency band signals; however, because signal classes of the current frame are different, the attenuated high-frequency band signal of the current frame or the attenuated to-be-encoded characteristic parameters of the high-frequency band signal of the current frame may also be different. For details, refer to the description of the embodiment shown in FIG. 5. In still another implementation, only signals of several classes are attenuated, or only signals of a certain class are attenuated, which does not influence the implementation of the present invention.

In a specific implementation, the signal class of the high-frequency band signal of the current frame may include a noise class, a predicted class, a transient class, a harmonic class and a normal class; in another specific implementation, the signal class of the high-frequency band signal of the current frame may include the noise class, the predicted class, the transient class, the harmonic class, a fricative class and a voiced class. The difference between the signal classes in the two specific implementations lies in that, in the latter on, the normal class is divided into the fricative class and the voiced class.

Manners of obtaining the energy attenuation value include, but are not limited to, the following two manners.

First manner The encoder encodes the low-frequency band signal of the current frame and locally decodes a result of encoding the low-frequency band signal; and uses a ratio of energy of the low-frequency band signal to energy of a signal obtained by the local decoding as the energy attenuation value. The energy attenuation value determined in this manner is the most accurate.

Second manner The energy attenuation value is preset at the encoder, and the energy attenuation value is obtained according to ratios of energy of multiple low-frequency band signals of the same-class frame to energy of signals obtained by decoding results of encoding the low-frequency band signals of the same-class frame, which may specifically be: obtaining a value by training according to the ratios by using an LBG algorithm, and using the value as the energy attenuation value, where the same-class frame is a data frame of the same signal class as the high-frequency band signal of the current frame.

In this manner, a corresponding energy attenuation value may be preset for all the signal classes, or a corresponding energy attenuation value may be preset only for signal classes requiring attenuation. For example, in a specific implementation, if only signals of a fricative class need to be attenuated, it only needs to preset an energy attenuation value of the signals of the fricative class.

403: Encode the attenuated high-frequency band signal or the attenuated to-be-encoded characteristic parameter of the high-frequency band signal.

The encoder in the embodiment of the present invention attenuates the high-frequency band signal or the to-be-encoded characteristic parameter of the high-frequency band signal according to the energy attenuation value of the low-frequency band signal of the current frame, and encodes and sends the attenuation result to a decoder, so that energy of the high-frequency band signal obtained by the decoder by decoding is attenuated accordingly; in this way, the high-frequency band signal is pleasant to ears of the user after being combined with the low-frequency band signal, thereby improving user experience.

Figure 5:
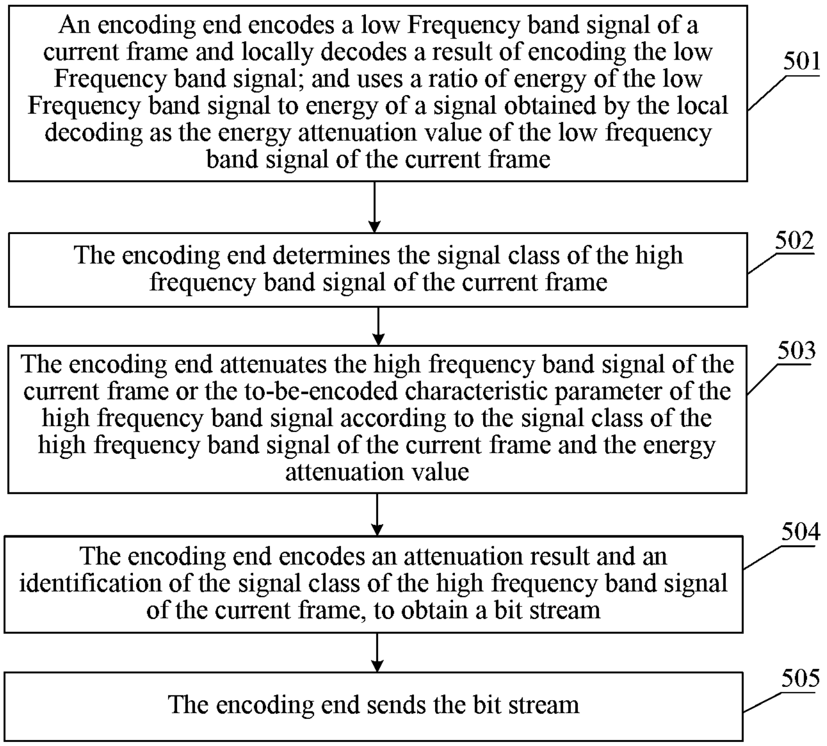
FIG. 5 is a flow chart of another encoding method provided in an embodiment of the present invention.

The technical solution provided in the above embodiment of the present invention is described in detail below through an embodiment shown in FIG. 5.

501: The encoder encodes the low-frequency band signal of the current frame and locally decodes a result of encoding the low-frequency band signal; and uses a ratio of energy of the low-frequency band signal to energy of a signal obtained by the local decoding as the energy attenuation value of the low-frequency band signal of the current frame.

502: The encoder determines a signal class of the high-frequency band signal of the current frame.

The signal class may be specifically determined by using a signal class determining method provided in the prior art, or the signal class determining method provided in the above embodiments of the present invention.

503: The encoder attenuates the high-frequency band signal of the current frame or the to-be-encoded characteristic parameter of the high-frequency band signal according to the signal class of the high-frequency band signal of the current frame and the energy attenuation value.

In this step, regardless of the signal class of the current frame, the encoder uses the energy attenuation value to attenuate the energy of the high-frequency band signal; however, for different signal classes, different processing manners are used. Specifically, when the class of the high-frequency band signal of the current frame is the transient class, the high-frequency band time-domain signal or the to-be-encoded time domain envelope of the high-frequency band signal is attenuated according to the energy attenuation value; when the class of the high-frequency band signal of the current frame is the fricative class, the harmonic class or the normal class, the high-frequency band frequency-domain signal or the to-be-encoded frequency domain envelope of the high-frequency band signal is attenuated according to the energy attenuation value.

504: The encoder encodes an attenuation result and an identification of the signal class of the high-frequency band signal of the current frame, to obtain a bit stream.

505: The encoder sends the bit stream.

The encoder in the embodiment of the present invention attenuates the high-frequency band signal of the current frame or the to-be-encoded characteristic parameter of the high-frequency band signal according to the energy attenuation value of the low-frequency band signal of the current frame, and encodes and sends the attenuation result to the decoder, so that energy of the high-frequency band signal obtained by the decoder by decoding is attenuated accordingly; in this way, the high-frequency band signal is pleasant to ears of the user after being combined with the low-frequency band signal, thereby improving user experience.

Alternatively, in a specific implementation, a data frame of a specific class may be attenuated, for example, when the encoder uses the CELP algorithm to encode a low-frequency band signal of a certain data frame, if the high-frequency band signal of the data frame is of the transient class, the low-frequency band signal of the data frame generally has sub-frames where an energy jump occurs, and it is generally considered that the low-frequency band signal of the data frame is also of the transient class. The CELP algorithm attenuates greatly the low-frequency band signal of the transient class, and attenuates slightly low-frequency band signals of other classes, and in such case, the attenuation of low-frequency band signals of other classes may be ignored, and only the attenuation of the low-frequency band signal of the transient class is taken into consideration, and in that case, only when the high-frequency band signal of the current frame is of the transient class, the high-frequency band time-domain signal of the current frame or the to-be-encoded time domain envelope of the high-frequency band signal is attenuated, that is, the high-frequency band time-domain signal of the current frame or the to-be-encoded time domain envelope of the high-frequency band signal is attenuated.

Alternatively, in still another specific implementation, not only the high-frequency band signal of the transient class needs to be attenuated, but also the high-frequency band signal of the fricative class needs to be attenuated. Because the normal class may be further divided into the fricative class and the voiced class, when the encoder encodes the low-frequency band signal of the voiced class by using the CELP algorithm, the encoding causes small energy attenuation, and when the encoder encodes the low-frequency band signal of the fricative class, the encoding causes great energy attenuation. Therefore before encoding the high-frequency band signal of the data frame, if the encoder determines that the high-frequency band signal of the data frame is of the fricative class, the encoder needs to attenuate the high-frequency band frequency-domain signal of the fricative class or the to-be-encoded frequency domain envelope of the high-frequency band signal of the fricative class, that is, the high-frequency band frequency-domain signal of the fricative class or the to-be-encoded frequency domain envelope of the high-frequency band signal of the fricative class is attenuated.

The energy attenuation value of the low-frequency band signal of the current frame used by the encoder in the above embodiment is: a ratio of energy of the low-frequency band signal of the current frame to energy of a signal obtained by locally decoding a result of encoding, by the encoder, encoding the low frequency band signal. Alternatively, in another specific implementation, for different signal classes, different energy attenuation values may be obtained by training by using the LBG algorithm, and then the obtained energy attenuation values are preset at the encoder and the decoder, for example, when the signal class of the high-frequency band signal includes the noise class, the predicted class, the transient class, the harmonic class and the normal class, one energy attenuation value is obtained for the noise class by training, one energy attenuation value is obtained for the predicted class by training, one energy attenuation value is obtained for the transient class by training, and one energy attenuation value is obtained for the normal class by training. The specific manner of obtaining one energy attenuation value corresponding to a certain signal class by training may be: obtaining ratios of energy of multiple low-frequency band signals of the signal class to energy of signals obtained by decoding, by the decoder, results of encoding the corresponding low-frequency band signals, obtaining one value by training according to the obtained ratios by using the LBG algorithm, and using the value as the energy attenuation value corresponding to the signal class. In still another specific implementation, if the normal signal class is further divided into the fricative class and the voiced class, energy attenuation values are obtained for the fricative class and the voiced class by training by using the LBG algorithm and preset at the encoder and the decoder. Alternatively, if only high-frequency band signals of some signal classes need to be attenuated, for example, only high-frequency band signals of the transient class and the fricative class are attenuated, it only needs to preset the energy attenuation value corresponding to the transient class and the energy attenuation value corresponding to the fricative class, and does not need to preset energy attenuation values corresponding to other classes.

Figure 6:
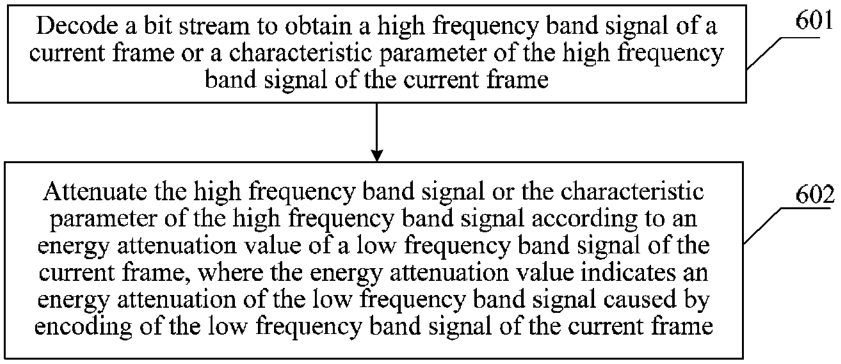
FIG. 6 is a flow chart of a decoding method provided in an embodiment of the present invention.

Referring to FIG. 6, an embodiment of the present invention provides a decoding method, which includes:

601: Decode a bit stream to obtain a high-frequency band signal of a current frame or a characteristic parameter of the high-frequency band signal of the current frame.

The embodiment of the present invention is implemented by a decoder.

The high-frequency band signal of the current frame may be a high-frequency band time-domain signal of the current frame or a high-frequency band frequency-domain signal of the current frame; the characteristic parameter of the high-frequency band signal of the current frame may be a time-domain envelope or a frequency-domain envelope of the high-frequency band signal of the current frame.

602: Attenuate the high-frequency band signal or the characteristic parameter of the high-frequency band signal according to an energy attenuation value of a low-frequency band signal of the current frame, where the energy attenuation value indicates energy attenuation of the low-frequency band signal caused by encoding of the low-frequency band signal.

The high-frequency band signal or the characteristic parameter of the high-frequency band signal may be specifically attenuated according to the energy attenuation value of the low-frequency band signal of the current frame and the signal class of the high-frequency band signal of the current frame. In another implementation, the decoder may attenuate the high-frequency band signals of all signal classes or characteristic parameters of the high-frequency band signals; however, because signal classes of the current frame are different, the attenuated high-frequency band signal of the current frame or the attenuated characteristic parameters of the high-frequency band signal of the current frame may also be different. For details, refer to the description of the embodiment shown in FIG. 7. In still another implementation, only signals of several classes are attenuated, or only signals of a certain class are attenuated, which does not influence the implementation of the present invention.

For the classification of the signal class of the high-frequency band signal, reference is made to the detailed description of the embodiment shown in FIG. 4, so the details will not be described herein again.

Obtaining of the energy attenuation value of the low-frequency band signal of the current frame includes, but is not limited to, the following two manners First manner: The decoder parses the bit stream sent by the encoder to obtain the energy attenuation value, that is, the energy attenuation value of the low-frequency band signal of the current frame is obtained by the encoder and sent to the decoder, and specifically, the encoder may use a ratio of energy of the low-frequency band signal of the current frame to energy of a signal obtained by locally decoding a result of encoding, by the encoder, the low-frequency band signal of the current frame as the energy attenuation value.

Second manner: The energy attenuation value of the low-frequency band signal of the current frame is preset at the decoder, and the energy attenuation value is obtained according to ratios of energy of multiple low-frequency band signals of the same-class frame to energy of signals obtained by decoding results of encoding the low-frequency band signals of the same-class frame, which may specifically be: obtaining a value by training according to the ratios by using an LBG algorithm, and using the value as the energy attenuation value, where the same-class frame is a data frame of the same signal class as the high-frequency band signal of the current frame.

The decoder in the embodiment of the present invention attenuates, according to the energy attenuation value of the low-frequency band signal of the current frame, the high-frequency band signal or the characteristic parameter of the high-frequency band signal obtained by decoding, so that the finally obtained high-frequency band signal is pleasant to ears of the user after being combined with the low-frequency band signal, thereby improving user experience.

The technical solution provided in the above embodiment of the present invention is described in detail below through an embodiment shown in FIG. 7.

701: The decoder receives a bit stream sent by the encoder, where the bit stream includes a result of encoding the high-frequency band signal, an energy attenuation value of the low-frequency band signal of the current frame, and an identification of the signal class of the high-frequency band signal of the current frame.

702: The decoder decodes the bit stream to obtain the energy attenuation value of the low-frequency band signal of the current frame, the signal class of the high-frequency band signal of the current frame, and the high-frequency band signal of the current frame or a characteristic parameter of the high-frequency band signal of the current frame.

703: The decoder attenuates the high-frequency band signal of the current frame or the characteristic parameter of the high-frequency band signal of the current frame according to the energy attenuation value of the low-frequency band signal of the current frame and the signal class of the high-frequency band signal of the current frame.

In this embodiment, regardless of the signal class of the current frame, the decoder uses the energy attenuation value of the low-frequency band signal of the current frame to attenuate the energy of the high-frequency band signal; however, for different signal classes, different processing manners are used. Specifically, when the class of the high-frequency band signal of the current frame is the transient class, the high-frequency band time-domain signal or the time-domain envelope of the high-frequency band signal is attenuated according to the energy attenuation value of the low-frequency band signal of the current frame; when the class of the high-frequency band signal of the current frame is the fricative class, the harmonic class or the normal class, the high-frequency band frequency-domain signal or the frequency-domain envelope of the high-frequency band signal is attenuated according to the energy attenuation value of the low-frequency band signal of the current frame.

The decoder in the embodiment of the present invention attenuates the high-frequency band signal of the current frame or the characteristic parameter of the high-frequency band signal obtained by decoding, so that the finally obtained high-frequency band signal is pleasant to ears of the user after being combined with the low-frequency band signal, thereby improving user experience.

Alternatively, in a specific implementation, the decoder may only attenuate signals of a specific class, for example, only when the high-frequency band signal of the current frame is of the transient class, the decoder attenuates the high-frequency band time-domain signal of the current frame or the time-domain envelope of the high-frequency band signal, that is, the high-frequency band time-domain signal of the current frame or the time-domain envelope of the high-frequency band signal is attenuated.

Alternatively, in still another specific implementation, not only the high-frequency band signal of the transient class needs to be attenuated, but also the high-frequency band signal of the fricative class needs to be attenuated. As such, the decoder obtains the high-frequency band signal of the fricative class by decoding, and then attenuates the high-frequency band signal of the fricative class, that is, the high-frequency band signal of the fricative class is attenuated. Alternatively, the decoder may obtain a frequency-domain envelope of the high-frequency band signal of the fricative class by decoding, and then attenuate the frequency-domain envelope of the high-frequency band signal of the fricative class, that is, the frequency-domain envelope of the high-frequency band signal of the fricative class is attenuated.

In the above embodiment, the energy attenuation value of the low-frequency band signal of the current frame is sent by the encoder to the decoder, and alternatively, in another specific implementation, the energy attenuation value may be preset at the decoder, that is, different energy attenuation values may be obtained for different signal classes by training by using the LBG algorithm, and then the obtained energy attenuation values are preset at the encoder and the decoder. The specific implementation is similar to the description of the foregoing corresponding part, so the details will not be described herein again.

Figure 8:
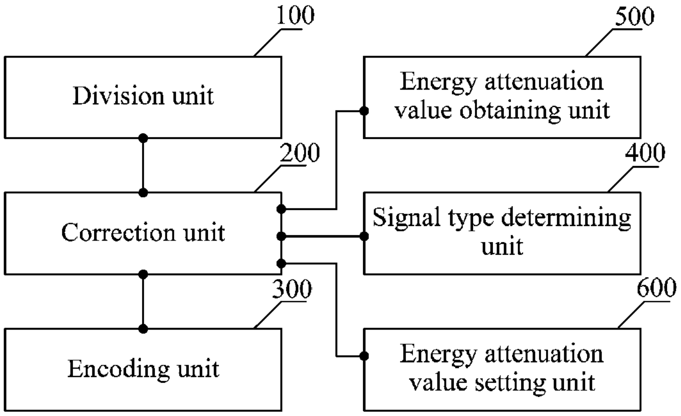
FIG. 8 is a structural diagram of an encoding device provided in an embodiment of the present invention.

Referring to FIG. 8, an embodiment of the present invention provides an encoding device, which includes:

a division unit 100, configured to divide a current frame into a low-frequency band signal and a high-frequency band signal;

a correction unit 200, configured to attenuate the high-frequency band signal or a to-be-encoded characteristic parameter of the high-frequency band signal according to an energy attenuation value of the low-frequency band signal, where the energy attenuation value indicates energy attenuation of the low-frequency band signal caused by encoding of the low-frequency band signal of the current frame, where the high-frequency band signal of the current frame may be a high-frequency band time-domain signal of the current frame or a high-frequency band frequency-domain signal of the current frame; the to-be-encoded characteristic parameter of the high-frequency band signal of the current frame may be an energy to-be-encoded characteristic parameter of the high-frequency band signal, and may specifically be a to-be-encoded time domain envelope or a to-be-encoded frequency domain envelope of the high-frequency band signal of the current frame; and an encoding unit 300, configured to encode the attenuated high-frequency band signal or the attenuated to-be-encoded characteristic parameter of the high-frequency band signal.

To determine a signal class of the high-frequency band signal of the current frame, the encoding device further includes: a signal class determining unit 400, configured to determine the signal class of the high-frequency band signal of the current frame; at this time, the correction unit 200 is configured to attenuate the high-frequency band signal or the to-be-encoded characteristic parameter of the high-frequency band signal according to the energy attenuation value and the signal class of the high-frequency band signal.

The correction unit 200 is specifically configured to attenuate a high-frequency band time-domain signal or a to-be-encoded time domain envelope of the high-frequency band signal according to the energy attenuation value, when the class of the high-frequency band signal is a transient class; and/or, the correction unit 200 is specifically configured to attenuate a high-frequency band frequency-domain signal or a to-be-encoded frequency domain envelope of the high-frequency band signal according to the energy attenuation value, when the class of the high-frequency band signal is a fricative class, a harmonic class or a normal class.

To obtain the energy attenuation value of the current frame, the encoding device may further include an energy attenuation value obtaining unit 500, configured to encode the low-frequency band signal and locally decoding a result of encoding the low-frequency band signal; and use a ratio of energy of the low-frequency band signal to energy of a signal obtained by the local decoding as the energy attenuation value; or, an energy attenuation value setting unit 600, configured to set the energy attenuation value of the current frame, where the energy attenuation value is obtained according to ratios of energy of multiple low-frequency band signals of the same-class frame to energy of signals obtained by decoding results of encoding the low-frequency band signals of the same-class frame, where the same-class frame is a data frame of the same signal class as the high-frequency band signal of the current frame. It should be noted that, although the energy attenuation value obtaining unit 500 and the energy attenuation value setting unit 600 are drawn in FIG. 8, the encoding may include the energy attenuation value obtaining unit 500 only but not include the energy attenuation value setting unit 600, or include the energy attenuation value setting unit 600 only but not include the energy attenuation value obtaining unit 500 in practical use.

The encoding device in the embodiment of the present invention attenuates the high-frequency band signal or the characteristic parameter to be decoded of the high-frequency band signal according to the energy attenuation value of the low-frequency band signal of the current frame, and encodes and sends the attenuation result to the decoder, so that energy of the high-frequency band signal obtained by the decoder by decoding is attenuated accordingly; in this way, the high-frequency band signal is pleasant to ears of the user after being combined with the low-frequency band signal, thereby improving user experience.

Figure 9:
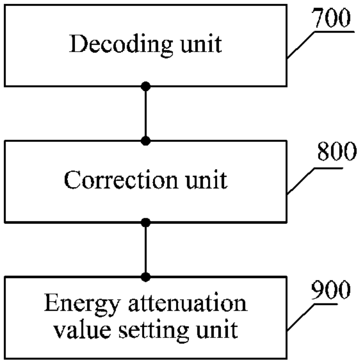
FIG. 9 is a structural diagram of a decoding device provided in an embodiment of the present invention.

Referring to FIG. 9, an embodiment of the present invention provides a decoding device, which includes:

a decoding unit 700, configured to decode a bit stream to obtain a high-frequency band signal of a current frame or a characteristic parameter of the high-frequency band signal of the current frame; and a correction unit 800, configured to attenuate the high-frequency band signal or the characteristic parameter of the high-frequency band signal according to an energy attenuation value of a low-frequency band signal of the current frame, where the energy attenuation value indicates energy attenuation of the low-frequency band signal caused by encoding of the low-frequency band signal of the current frame.

To obtain a signal class of the high-frequency band signal of the current frame, the decoding unit 700 is further configured to decode the bit stream to obtain the signal class of the high-frequency band signal of the current frame; and the correction unit 800 is specifically configured to attenuate the high-frequency band signal or the characteristic parameter of the high-frequency band signal according to the energy attenuation value and the signal class of the high-frequency band signal of the current frame.

Specifically, the correction unit 800 is specifically configured to attenuate a high-frequency band time-domain signal or a time-domain envelope of the high-frequency band signal according to the energy attenuation value, when the class of the high-frequency band signal of the current frame is a transient class; and/or, the correction unit is specifically configured to attenuate a high-frequency band frequency-domain signal or a frequency-domain envelope of the high-frequency band signal according to the energy attenuation value, when the class of the high-frequency band signal of the current frame is a fricative class, a harmonic class or a normal class.

To obtain the energy attenuation value of the current frame, the decoding unit 700 is further configured to decode the energy attenuation value from the bit stream, where the energy attenuation value indicates: a ratio of energy of the low-frequency band signal of the current frame to energy of a signal obtained by locally decoding a result of encoding, by an encoder, the low-frequency band signal of the current frame.

Alternatively, to obtain the energy attenuation value of the current frame, the decoding device further includes: an energy attenuation value setting unit 900, configured to set the energy attenuation value of the current frame, where the energy attenuation value is obtained according to a ratio of energy of a low-frequency band signal of a same-class frame to energy of a signal obtained by decoding a result of encoding the low-frequency band signal of the same-class frame, where the same-class frame is a data frame of the same signal class as the high-frequency band signal of the current frame.

The decoding device in the embodiment of the present invention attenuates, according to the energy attenuation value of the low-frequency band signal of the current frame, the high-frequency band signal or the characteristic parameter of the high-frequency band signal obtained by decoding, so that the finally obtained high-frequency band signal is pleasant to ears of the user after being combined with the low-frequency band signal, thereby improving user experience.

Persons of ordinary skill in the art should understand that, all of or a part of the steps in the method according to the embodiments may be implemented by a program instructing relevant hardware. The program may be stored in a computer readable storage medium such as a read-only memory, a magnetic disk or an optical disk.

The signal classification method and device and the encoding and decoding methods and devices according to the embodiments of the present invention are described in detail above. The principle and implementation of the present invention are described herein through specific examples. The description about the embodiments is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. An encoding method for processing voice/audio signals, comprising:

dividing, by an encoder, a current frame into a low-frequency band signal and a high-frequency band signal; wherein the encoder comprises a processor;

attenuating, by the encoder, a one of the group consisting of the high-frequency band signal and a to-be-encoded characteristic parameter of the high-frequency band signal, the attenuating being according to an energy attenuation value of the low-frequency band signal, and wherein the energy attenuation value indicates energy attenuation of the low-frequency band signal caused by encoding of the low-frequency band signal; and encoding, by the encoder, the one of the group consisting of the attenuated high-frequency band signal and the attenuated to-be-encoded characteristic parameter of the high-frequency band signal.

2. The method according to claim 1, further comprising:

determining a signal class of the high-frequency band signal; and wherein the attenuating the one of the group consisting of the high-frequency band signal and the to-be-encoded characteristic parameter of the high-frequency band signal according to the energy attenuation value of the low-frequency band signal comprises:

attenuating the one of the group consisting of the high-frequency band signal and the to-be-encoded characteristic parameter of the high-frequency band signal according to the energy attenuation value and the signal class of the high-frequency band signal.

3. The method according to claim 2, wherein the attenuating the one of the group consisting of the high-frequency band signal and the to-be-encoded characteristic parameter of the high-frequency band signal according to the energy attenuation value and the signal class of the high-frequency band signal comprises conditionally executing the following:

when the signal class of the high-frequency band signal is a transient class, attenuating a one of the group consisting of a high-frequency band time-domain signal and a to-be-encoded time domain envelope of the high-frequency band signal according to the energy attenuation value;

and, when the signal class of the high-frequency band signal is a one of the group consisting of a fricative class, a harmonic class and a normal class, attenuating one of the group consisting of a high-frequency band frequency-domain signal and a to-be-encoded frequency domain envelope of the high-frequency band signal according to the energy attenuation value.

4. The method according to claim 1, further comprising:

encoding the low-frequency band signal and locally decoding a result of encoding the low-frequency band signal; and using a ratio of energy of the low-frequency band signal to energy of a signal obtained by the locally decoding as the energy attenuation value.

5. The method according to claim 1, wherein the energy attenuation value is a preset value, and the energy attenuation value is obtained according to ratios of energy of multiple low-frequency band signals of a same-class frame to energy of signals obtained by decoding encoding results of the low-frequency band signals of the same-class frame, wherein the same-class frame is a data frame of the same signal class as the high-frequency band signal of the current frame.

6. A decoding method for processing voice/audio signals, comprising:

decoding, by a decoder, a bit stream to obtain a one of the group consisting of (a) a high-frequency band signal of a current frame and (b) a characteristic parameter of the high-frequency band signal of the current frame; wherein the decoder comprises a processor; and attenuating, by the decoder, the one of the group consisting of (a) the high-frequency band signal and (b) the characteristic parameter of the high-frequency band signal according to an energy attenuation value of a low-frequency band signal of the current frame, wherein the energy attenuation value indicates energy attenuation of the low-frequency band signal caused by encoding of the low-frequency band signal.

7. The method according to claim 6, further comprising:

decoding the bit stream to obtain a signal class of the high-frequency band signal of the current frame; and wherein the attenuating the one of the group consisting of the high-frequency band signal and the characteristic parameter of the high-frequency band signal according to the energy attenuation value of the low-frequency band signal of the current frame comprises:

attenuating the one of the group consisting of the high-frequency band signal and the characteristic parameter of the high-frequency band signal according to the energy attenuation value and the signal class of the high-frequency band signal of the current frame.

8. The method according to claim 7, wherein the attenuating the one of the group consisting of the high-frequency band signal and the characteristic parameter of the high-frequency band signal according to the energy attenuation value and the signal class of the high-frequency band signal of the current frame comprises conditionally executing the following:

when the signal class of the high-frequency band signal of the current frame is one of the group consisting of a transient class, attenuating a high-frequency band time-domain signal and a time-domain envelope of the high-frequency band signal according to the energy attenuation value;

and when the signal class of the high-frequency band signal of the current frame is one of the group consisting of a fricative class, a harmonic class and a normal class, attenuating one of the group consisting of a high-frequency band frequency-domain signal and a frequency-domain envelope of the high-frequency band signal according to the energy attenuation value.

9. The method according to claim 6, further comprising:

decoding the bit stream to obtain the energy attenuation value, wherein the energy attenuation value indicates: a ratio of energy of the low-frequency band signal of the current frame to energy of a signal obtained by locally decoding a result of encoding, by an encoder, the low-frequency band signal of the current frame.

10. The method according to claim 6, wherein the energy attenuation value is a preset value, and the energy attenuation value is obtained according to a ratio of energy of a low-frequency band signal of a same-class frame to energy of a signal obtained by decoding a result of encoding the low-frequency band signal of the same-class frame, wherein the same-class frame is a data frame of the same signal class as the high-frequency band signal of the current frame.

11. An encoding device for processing voice/audio signals, comprising:

a processor;

a division unit controlled by the processor, configured to divide a current frame into a low-frequency band signal and a high-frequency band signal;

a correction unit controlled by the processor, configured to attenuate a one of the group consisting of the high-frequency band signal and a to-be-encoded characteristic parameter of the high-frequency band signal according to an energy attenuation value of the low-frequency band signal, wherein the energy attenuation value indicates energy attenuation of the low-frequency band signal caused by encoding of the low-frequency band signal of the current frame; and an encoding unit controlled by the processor, configured to encode the one of the group consisting of the attenuated high-frequency band signal and the attenuated to-be-encoded characteristic parameter of the high-frequency band signal.

12. The device according to claim 11, further comprising:

a signal class determining unit, configured to determine a signal class of the high-frequency band signal;

wherein the correction unit is configured to attenuate the one of the group consisting of the high-frequency band signal and the to-be-encoded characteristic parameter of the high-frequency band signal according to the energy attenuation value and the signal class of the high-frequency band signal.

13. The device according to claim 12, wherein the correction unit is configured to conditionally:

attenuate the one of the group consisting of a high-frequency band time-domain signal and a to-be-encoded time domain envelope of the high-frequency band signal according to the energy attenuation value when the signal class of the high-frequency band signal is a transient class;

and attenuate the one of the group consisting of a high-frequency band frequency-domain signal and a to-be-encoded frequency domain envelope of the high-frequency band signal according to the energy attenuation value when the signal class of the high-frequency band signal is one of the group consisting of a fricative class, a harmonic class and a normal class.

14. The device according to claim 11, further comprises:

an energy attenuation value obtaining unit configured to encode the low-frequency band signal and locally decode a result of encoding the low-frequency band signal; and use a ratio of energy of the low-frequency band signal to energy of a signal obtained by the local decoding as the energy attenuation value.

15. The device according to claim 11, further comprises:

an energy attenuation value setting unit configured to set the energy attenuation value, wherein the energy attenuation value is obtained according to ratios of energy of multiple low-frequency band signals of a same-class frame to energy of signals obtained by decoding results of encoding the low-frequency band signals of the same-class frame, wherein the same-class frame is a data frame of the same signal class as the high-frequency band signal of the current frame.

16. A decoding device for processing voice/audio signals, comprising:

a processor;

a decoding unit controlled by the processor, configured to decode a bit stream to obtain a one of the group consisting of a high-frequency band signal of a current frame and a characteristic parameter of the high-frequency band signal of the current frame; and a correction unit controlled by the processor, configured to attenuate the one of the group consisting of the high-frequency band signal and the characteristic parameter of the high-frequency band signal according to an energy attenuation value of a low-frequency band signal of the current frame, wherein the energy attenuation value indicates energy attenuation of the low-frequency band signal caused by encoding of the low-frequency band signal of the current frame.

17. The device according to claim 16, wherein the decoding unit is further configured to decode the bit stream to obtain a signal class of the high-frequency band signal of the current frame; and the correction unit is configured to attenuate the one of the group consisting of the high-frequency band signal and the characteristic parameter of the high-frequency band signal according to the energy attenuation value and the signal class of the high-frequency band signal of the current frame.

18. The device according to claim 17, wherein the correction unit is configured to conditionally execute the following:

attenuating one of the group consisting of a high-frequency band time-domain signal and a time-domain envelope of the high-frequency band signal according to the energy attenuation value when the signal class of the high-frequency band signal of the current frame is a transient class;

and attenuating one of the group consisting of a high-frequency band frequency-domain signal and a frequency-domain envelope of the high-frequency band signal according to the energy attenuation value when the signal class of the high-frequency band signal of the current frame is one of the group consisting of a fricative class, a harmonic class and a normal class.

19. The device according to claim 16, wherein the decoding unit is further configured to decode the bit stream to obtain the energy attenuation value, wherein the energy attenuation value indicates: a ratio of energy of the low-frequency band signal of the current frame to energy of a signal obtained by locally decoding a result of encoding, by an encoder, the low-frequency band signal of the current frame.

20. The device according to claim 16, further comprising: an energy attenuation value setting unit configured to set the energy attenuation value of the current frame, wherein the energy attenuation value is obtained according to a ratio of energy of a low-frequency band signal of a same-class frame to energy of a signal obtained by decoding a result of encoding the low-frequency band signal of the same-class frame, and the same-class frame is a data frame of the same signal class as the high-frequency band signal of the current frame.

21. A signal classification method for processing voice/audio signals, comprising:

dividing, by an encoder, a current frame into a low-frequency band signal and a high-frequency band signal; wherein the encoder comprises a processor;

determining, by the encoder, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter; and determining, by the encoder, a signal class of the high-frequency band signal of the current frame according to a determining result.

22. The method according to claim 21, wherein the preset encoding/decoding characteristic parameter corresponding to the signal class comprises an encoding/decoding characteristic parameter corresponding to a noise class; and the encoding/decoding characteristic parameter corresponding to the noise class is one of the group consisting of: a correlation parameter between an amplitude of a low-frequency band frequency-domain signal and an amplitude of a high-frequency band frequency-domain signal, and a correlation parameter between energy of the low-frequency band frequency-domain signal and energy of the high-frequency band frequency-domain signal.

23. The method according to claim 22, further comprising:

determining whether the number of sub-bands having a peak-to-average ratio smaller than a second threshold is greater than a second predetermined number; and wherein the determining the signal class of the high-frequency band signal of the current frame comprises:

when the number of sub-bands having a peak-to-average ratio smaller than the second threshold is greater than the second predetermined number, and a value of the encoding/decoding characteristic parameter of the current frame corresponding to the noise class meets the value requirement of the preset encoding/decoding characteristic parameter corresponding to the noise class, determining that the signal class of the high-frequency band signal of the current frame is the noise class.

24. The method according to claim 21, wherein the preset encoding/decoding characteristic parameter corresponding to the signal class comprises a one of the group consisting of an encoding/decoding characteristic parameter corresponding to a predicted class, and an encoding/decoding characteristic parameter corresponding to a harmonic class; and the encoding/decoding characteristic parameter corresponding to the predicted class and the encoding/decoding characteristic parameter corresponding to the harmonic class are one of the group consisting of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low-frequency band excitation spectrum and a frequency-domain coefficient of a high-frequency band excitation spectrum, and a correlation parameter between an absolute value of the frequency-domain coefficient of the low-frequency band excitation spectrum and an absolute value of the frequency-domain coefficient of the high-frequency band excitation spectrum.

25. The method according to claim 24, further comprising:

determining whether the number of sub-bands having a peak-to-average ratio greater than a first threshold is greater than a first predetermined number; and when the preset encoding/decoding characteristic parameter corresponding to the signal class comprises the encoding/decoding characteristic parameter corresponding to the harmonic class, the determining the signal class of the high-frequency band signal of the current frame comprises:

when the number of sub-bands having a peak-to-average ratio greater than the first threshold is greater than the first predetermined number and a value of the encoding/decoding characteristic parameter of the current frame corresponding to the harmonic class meets the value requirement of the preset encoding/decoding characteristic parameter corresponding to the harmonic class, determining that the signal class of the high-frequency band signal of the current frame is the harmonic class.

26. The method according to claim 24, further comprising:

determining whether the number of sub-bands having a peak-to-average ratio greater than a first threshold is greater than a first predetermined number; and when the preset encoding/decoding characteristic parameter corresponding to the signal class comprises the encoding/decoding characteristic parameter corresponding to the predicted class, the determining the signal class of the high-frequency band signal of the current frame comprises:

when the number of sub-bands having a peak-to-average ratio greater than the first threshold is not greater than the first predetermined number and a value of the encoding/decoding characteristic parameter of the current frame corresponding to the predicted class meets the value requirement of the preset encoding/decoding characteristic parameter corresponding to the predicted class, determining that the signal class of the high-frequency band signal of the current frame is the predicted class.

27. The method according to claim 21, wherein the preset encoding/decoding characteristic parameter corresponding to the signal class further comprises an encoding/decoding characteristic parameter corresponding to a predicted class, and an encoding/decoding characteristic parameter corresponding to a harmonic class;

each of the encoding/decoding characteristic parameter corresponding to the predicted class and the encoding/decoding characteristic parameter corresponding to the harmonic class is one of the group consisting of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low-frequency band excitation spectrum and a frequency-domain coefficient of a high-frequency band excitation spectrum, and a correlation parameter between an absolute value of the frequency-domain coefficient of the low-frequency band excitation spectrum and an absolute value of the frequency-domain coefficient of the high-frequency band excitation spectrum; and the method further comprises: determining whether the number of sub-bands having a peak-to-average ratio greater than a first threshold is greater than a first predetermined number; and determining whether the number of sub-bands having a peak-to-average ratio smaller than a second threshold is greater than a second predetermined number; and wherein the determining the signal class of the high-frequency band signal of the current frame comprises conditionally executing the following:

when the number of sub-bands having a peak-to-average ratio greater than the first threshold is greater than the first predetermined number, and a value of the encoding/decoding characteristic parameter of the current frame corresponding to the harmonic class meets the value requirement of the preset encoding/decoding characteristic parameter corresponding to the harmonic class, determining that the signal class of the high-frequency band signal of the current frame is the harmonic class; and when the number of sub-bands having a peak-to-average ratio greater than the first threshold is not greater than the first predetermined number, the number of sub-bands having a peak-to-average ratio smaller than the second threshold is not greater than the second predetermined number, and a value of the encoding/decoding characteristic parameter of the current frame corresponding to the predicted class meets the value requirement of the preset encoding/decoding characteristic parameter corresponding to the predicted class, determining that the signal class of the high-frequency band signal of the current frame is the predicted class.

28. The method according to claim 21, further comprising:

dividing a full-frequency time-domain signal of the current frame into N sub-frames, and when energy of one sub-frame is greater than a predetermined number of times of energy of a previous sub-frame of the sub-frame, determining that the signal class of the high-frequency band signal of the current frame is a transient class.

29. A signal classification device for processing voice/audio signals, comprising:

a processor;

a division unit controlled by the processor, configured to divide a current frame into a low-frequency band signal and a high-frequency band signal;

a judgment unit controlled by the processor, configured to determine, according to a value requirement of a preset encoding/decoding characteristic parameter corresponding to a signal class, whether an encoding/decoding characteristic parameter of the current frame corresponding to the signal class meets the value requirement of the encoding/decoding characteristic parameter; and a determination unit controlled by the processor, configured to determine a signal class of the high-frequency band signal of the current frame according to a determining result.

30. The device according to claim 29, wherein the preset encoding/decoding characteristic parameter corresponding to the signal class comprises: an encoding/decoding characteristic parameter corresponding to a noise class; and the encoding/decoding characteristic parameter corresponding to the noise class is one of the group consisting of: a correlation parameter between an amplitude of a low-frequency band frequency-domain signal and an amplitude of a high-frequency band frequency-domain signal, and a correlation parameter between energy of the low-frequency band frequency-domain signal and energy of the high-frequency band frequency-domain signal.

31. The device according to claim 30, wherein the device further comprises: a second peak-to-average ratio judgment unit, configured to determine whether the number of sub-bands having a peak-to-average ratio smaller than a second threshold in the high-frequency band signal of the current frame is greater than a second predetermined number; and the determination unit comprises:

a noise class determining unit, configured to determine that the signal class of the high-frequency band signal of the current frame is the noise class, when the number of sub-bands having a peak-to-average ratio smaller than the second threshold is greater than the second predetermined number, and a value of the encoding/decoding characteristic parameter of the current frame corresponding to the noise class meets the value requirement of the preset encoding/decoding characteristic parameter corresponding to the noise class.

32. The device according to claim 29, wherein the preset encoding/decoding characteristic parameter corresponding to the signal class comprises an encoding/decoding characteristic parameter corresponding to a predicted class, or an encoding/decoding characteristic parameter corresponding to a harmonic class; and each of the encoding/decoding characteristic parameter corresponding to the predicted class and the encoding/decoding characteristic parameter corresponding to the harmonic class is one of the group consisting of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low-frequency band excitation spectrum and a frequency-domain coefficient of a high-frequency band excitation spectrum, and a correlation parameter between an absolute value of the frequency-domain coefficient of the low-frequency band excitation spectrum and an absolute value of the frequency-domain coefficient of the high-frequency band excitation spectrum.

33. The device according to claim 29, wherein the device further comprises: a first peak-to-average ratio judgment unit, configured to determine whether the number of sub-bands having a peak-to-average ratio greater than a first threshold in the high-frequency band signal of the current frame is greater than a first predetermined number; and when the preset encoding/decoding characteristic parameter corresponding to the signal class comprises the encoding/decoding characteristic parameter corresponding to the harmonic class, the determination unit comprises:

a harmonic class determining unit, configured to determine that the signal class of the high-frequency band signal of the current frame is the harmonic class, when the number of sub-bands having a peak-to-average ratio greater than the first threshold is greater than the first predetermined number, and a value of the encoding/decoding characteristic parameter of the current frame corresponding to the harmonic class meets the value requirement of the preset encoding/decoding characteristic parameter corresponding to the harmonic class.

34. The device according to claim 29, wherein the device further comprises: a first peak-to-average ratio judgment unit, configured to determine whether the number of sub-bands having a peak-to-average ratio greater than a first threshold in the high-frequency band signal of the current frame is greater than a first predetermined number; and when the preset encoding/decoding characteristic parameter corresponding to the signal class comprises the encoding/decoding characteristic parameter corresponding to the predicted class, the determination unit comprises:

a predicted class determining unit, configured to determine that the signal class of the high-frequency band signal of the current frame is the predicted class, when the number of sub-bands having a peak-to-average ratio greater than the first threshold is not greater than the first predetermined number, and a value of the encoding/decoding characteristic parameter of the current frame corresponding to the predicted class meets the value requirement of the preset encoding/decoding characteristic parameter corresponding to the predicted class.

35. The device according to claim 29, wherein the preset encoding/decoding characteristic parameter corresponding to the signal class comprises an encoding/decoding characteristic parameter corresponding to a predicted class, and an encoding/decoding characteristic parameter corresponding to a harmonic class;

each of the encoding/decoding characteristic parameter corresponding to the predicted class and the encoding/decoding characteristic parameter corresponding to the harmonic class is one of the group consisting of: a correlation parameter between a frequency-domain coefficient of the low-frequency band signal and a frequency-domain coefficient of the high-frequency band signal, a correlation parameter between an absolute value of the frequency-domain coefficient of the low-frequency band signal and an absolute value of the frequency-domain coefficient of the high-frequency band signal, a correlation parameter between a frequency-domain coefficient of a low-frequency band excitation spectrum and a frequency-domain coefficient of a high-frequency band excitation spectrum, and a correlation parameter between an absolute value of the frequency-domain coefficient of the low-frequency band excitation spectrum and an absolute value of the frequency-domain coefficient of the high-frequency band excitation spectrum;

the device further comprises: a first peak-to-average ratio judgment unit, configured to determine whether the number of sub-bands having a peak-to-average ratio greater than a first threshold in the high-frequency band signal of the current frame is greater than a first predetermined number; and a second peak-to-average ratio judgment unit, configured to determine whether the number of sub-bands having a peak-to-average ratio smaller than a second threshold in the high-frequency band signal of the current frame is greater than a second predetermined number; and the determination unit comprises:

a harmonic class determining unit, configured to determine that the signal class of the high-frequency band signal of the current frame is the harmonic class, when the number of sub-bands having a peak-to-average ratio greater than the first threshold is greater than the first predetermined number, and a value of the encoding/decoding characteristic parameter of the current frame corresponding to the harmonic class meets the value requirement of the preset encoding/decoding characteristic parameter corresponding to the harmonic class; and a predicted class determining unit, configured to determine that the signal class of the high-frequency band signal of the current frame is the predicted class, when the number of sub-bands having a peak-to-average ratio greater than the first threshold is greater than the first predetermined number, the number of sub-bands having a peak-to-average ratio smaller than the second threshold is not greater than the second predetermined number, and a value of the encoding/decoding characteristic parameter of the current frame corresponding to the predicted class meets the value requirement of the preset encoding/decoding characteristic parameter corresponding to the predicted class.

36. The device according to claim 29, wherein the device further comprises:

a transient class determining unit, configured to divide a full-frequency band time-domain signal of the current frame into N sub-frames, and when energy of one sub-frame is greater than a predetermined number of times of energy of a previous sub-frame of the sub-frame, determine that the signal class of the high-frequency band signal of the current frame is a transient class.

* * * * *